United States Patent [19]

Wang

[11] Patent Number: 5,666,651
[45] Date of Patent: Sep. 9, 1997

[54] METHOD AND APPARATUS FOR SCHEDULING MESSAGE TRAFFIC IN A MULTICELL RADIO COMMUNICATION SYSTEM

[75] Inventor: Zhonghe Wang, Lake Worth, Fla.

[73] Assignee: Motorola, Inc., Schaumburg, Ill.

[21] Appl. No.: 476,771

[22] Filed: Jun. 7, 1995

[51] Int. Cl.$^6$ .................................................. H04B 15/00
[52] U.S. Cl. ........................... 455/512; 455/63; 455/67.3; 455/67.6
[58] Field of Search ........................ 455/33.1, 33.2, 455/34.1, 54.1, 54.2, 56.1, 63, 62, 67.1, 67.3, 67.6; 340/825.44; 379/59

[56] References Cited

U.S. PATENT DOCUMENTS

| | | | |
|---|---|---|---|
| 4,670,906 | 6/1987 | Thro . | |
| 5,157,709 | 10/1992 | Ohteru | 455/56.1 |
| 5,179,722 | 1/1993 | Gunmar et al. | 455/33.1 |
| 5,212,684 | 5/1993 | MacNamee et al. | 455/33.1 |
| 5,260,700 | 11/1993 | Merchant et al. | 455/54.1 |

Primary Examiner—Reinhard J. Eisenzopf
Assistant Examiner—Thanh Le
Attorney, Agent, or Firm—James A. Lamb

[57] ABSTRACT

In a system controller (102) for scheduling message traffic for transmission to a plurality of selective-call radios (106) in a radio communication system (100), a set of interference coefficients is determined in which an interference coefficient is a measure of transmission interference at a first transmission unit (202) of a pair of transmission units (202) from a second transmission unit (202) of the pair of transmission units (202). A set of transmission unit assignments is modified to establish an assignment of a proposed transmission unit (202). The assignment is determined from the set of interference coefficients.

27 Claims, 10 Drawing Sheets

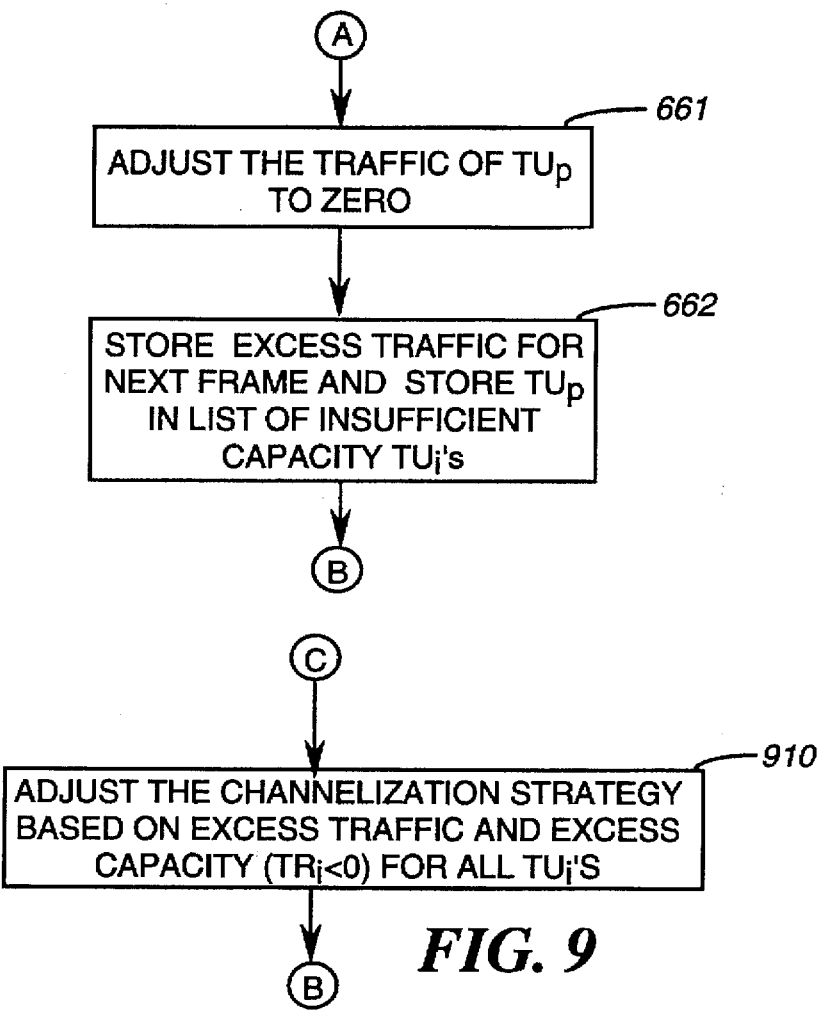
FIG. 8
FIG. 9
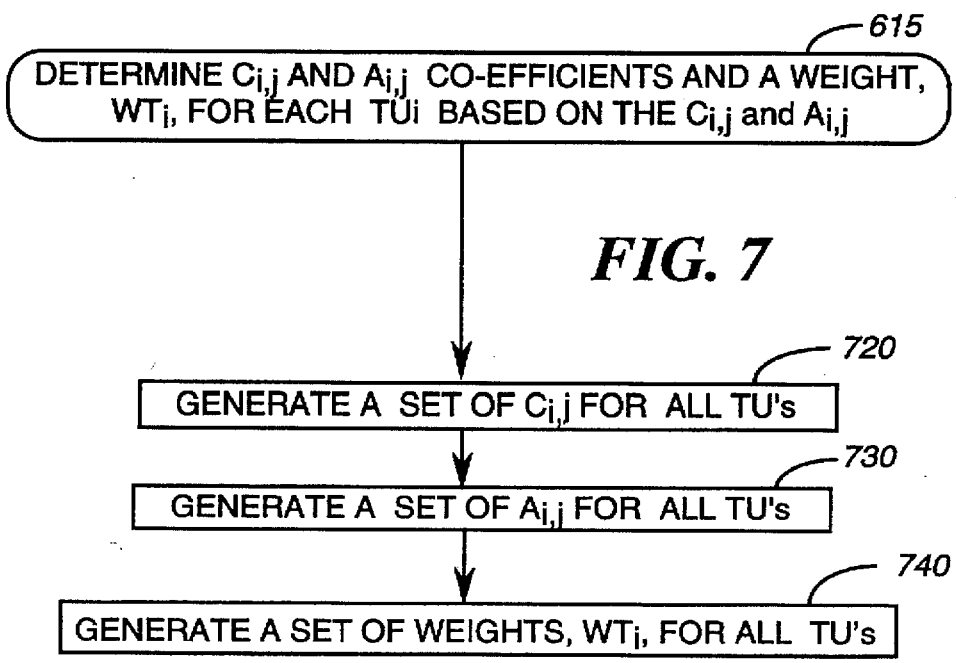
FIG. 7

METHOD AND APPARATUS FOR SCHEDULING MESSAGE TRAFFIC IN A MULTICELL RADIO COMMUNICATION SYSTEM

FIELD OF THE INVENTION

This invention relates in general to scheduling message traffic in a radio communication system, and in particular to scheduling message traffic in a multicell, multichannel radio communication system in a manner which improves throughput efficiency.

BACKGROUND OF THE INVENTION

In multicell radio communication systems the technique of frequency re-use has been employed to improve transmission efficiency. For example, in a system having inbound and outbound radio communication capability, a technique is described in U.S. Pat. No. 4,670,906, entitled "DATA COMMUNICATION SYSTEM TRANSMITTER SELECTION METHOD AND APPARATUS", to Thro, and assigned to the assignee hereof, which selects a transmitter to transmit a message to a portable radio transceiver based on a received signal strength indication (RSSI) measurement of an inbound signal transmitted from the portable radio transceiver to a central controller of the radio communication system. While this technique works quite well, it has several limitations, incluring errors due to radio frequency (RF) signal fading during the RSSI measurement, lack of support of multiple channels, and unsuitability for use in a one way, outbound system. Another technique, used in a multicell, multichannel system, involves a predetermined assignment of each of several differing outbound channels (for example, seven) to each cell in a manner that allows simultaneous transmission from all cells. This technique works well when all cells are large enough that interchannel interference (most especially, adjacent channel interference) does not degrade system performance and message traffic distribution is substantially uniform. However, this technique is less successful when cells of varying size, especially small cells, are needed to provide sufficient capacity for a one-way way (outbound only) or a two way (inbound and outbound) radio communication system, and does not adapt well to non-uniform distribution of traffic.

Thus, what is needed is an improved technique for scheduling message traffic in a multicell radio communication system having heterogeneous cells and non-uniform distribution of message traffic.

BRIEF DESCRIPTION OF THE DRAWINGS

FIGS. 6–11 show a flow chart of a method used in the system controller for scheduling the message traffic for transmission to a plurality of selective call radios in the radio communication system, in accordance with the preferred embodiment of the present invention.

DETAILED DESCRIPTIO OF THE DRAWINGS

Figure 1:
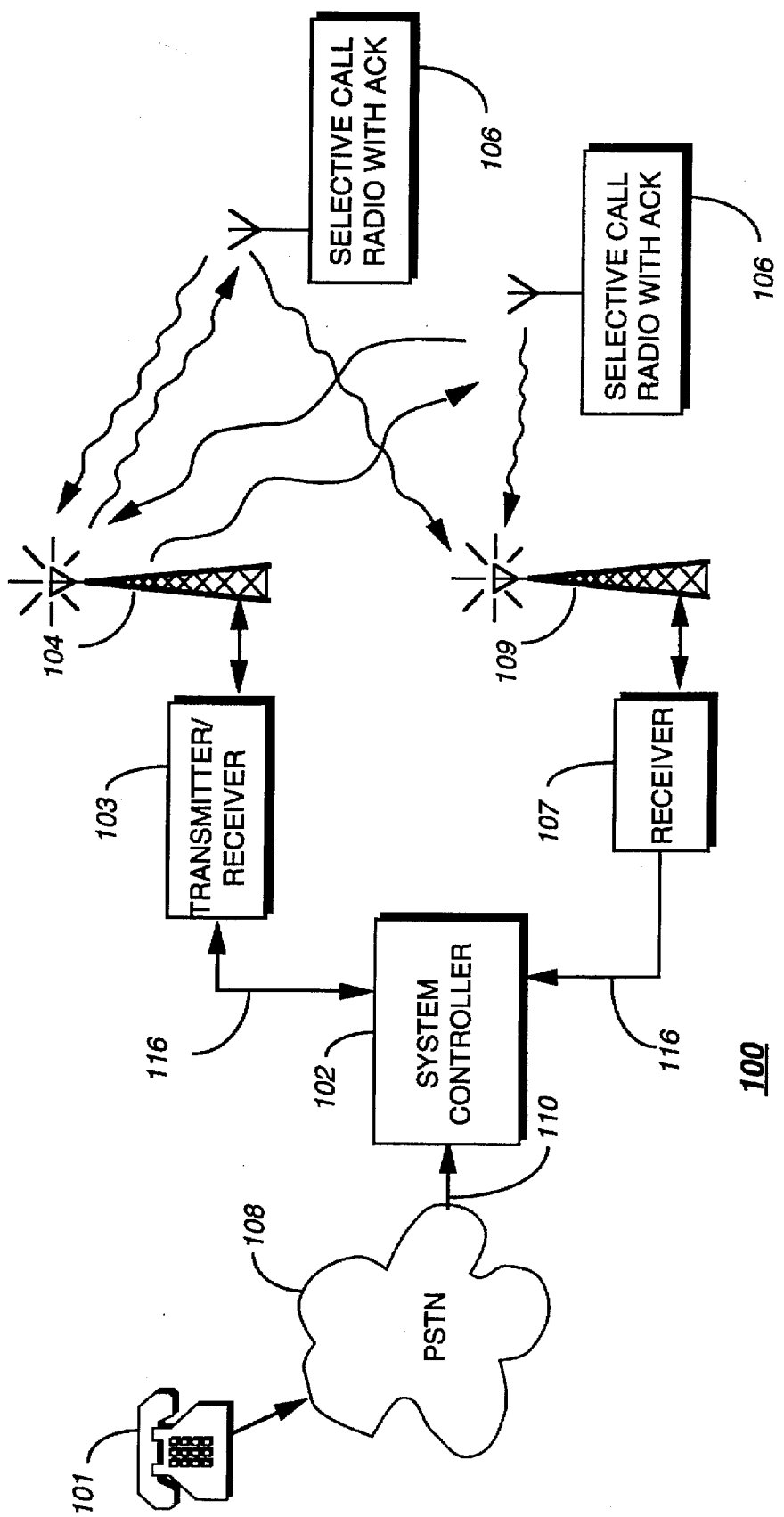
FIG. 1 shows an electrical block diagram of a radio communication system, in accordance with the preferred embodiment of the present invention.

Referring to FIG. 1, an electrical block diagram of a radio communication system 100 is shown in accordance with the preferred embodiment of the present invention. The radio communication system 100 comprises a message input device, such as a conventional telephone 101 connected through a conventional switched telephone network (PSTN) 108 by conventional telephone links 110 to a system controller 102. The system controller 102 oversees the operation of at least one radio frequency transmitter/receiver 103 and at least one fixed system receiver 107, through one or more communication links 116, which typically are twisted pair telephone wires, and additionally can include RF, microwave, or other high quality audio communication links. The system controller 102 encodes and decodes inbound and outbound telephone addresses into formats that are compatible with land line message switch computers. The system controller 102 also functions to digitally encode and schedule outbound messages, which can include such information as digitized audio messages, alphanumeric messages, analog information, and response commands, for transmission by the radio frequency transmitter/receivers 103 ecoa plurality of multichannel selective call radios 106 on a set of outbound radio channels. The system controller 102 further functions to decode inbound messages, including unsolicited and response messages, received by the radio frequency transmitter/receivers 103 and the fixed system receivers 107 from the plurality of selective call radios 106.

Examples of response messages are acknowledgments and designated response messages. Designated response messages are communicated in the inbound channel in portions named data units. An acknowledgment is a response to an outbound message initiated at the system controller 102. An example of an outbound alphanumeric message intended for a selective call radio 106 is a page message entered from the telephone 101. The outbound messages are included in outbound radio signals transmitted from a conventional antenna 104 coupled to the radio frequency transmitter/receiver 103. The inbound messages are included in inbound radio signals received by the conventional antenna 104 coupled to the radio frequency transmitter/receiver 103 and the conventional antenna 109 coupled to the fixed system receiver 107.

It should be noted that the system controller 102 is capable of operating in a distributed transmission control environment that allows mixing conventional cellular, simulcast, master/slave, or other coverage schemes involving a plurality of radio frequency transmitter/receivers 103, conventional antennas 104, 109, and fixed system receivers 107, for providing reliable radio signals within a geographic area as large as a nationwide network. Moreover, as one of ordinary skill in the art would recognize, the telephonic and selective call radio communication system functions may reside in separate system controllers 102 which operate either independently or in a networked fashion.

It should also be noted that the radio frequency transmitter/receiver 103 may comprise the fixed system receiver 107 collocated with a conventional radio frequency transmitter.

It will be appreciated that other selective call radio devices (not shown in FIG. 1), such as one and two way pagers, conventional mobile cellular telephones, conventional mobile radios, conventional mobile cellular telephones or trunked mobile radios, which have single or multichannel receiving capability and which optionally have a data terminal attached thereto, or optionally have mobile data terminal capability built in, are also able to be used in the radio communication system 100. In the following description, the term "selective call radio" will be used to refer to any of the selective call radio devices listed above. Each of the selective call radios assigned for use in the radio communication system 100 has an address assigned thereto which is a unique selective call address in the radio communication system 100. The address enables the transmission of a message from the system controller 102 only to the addressed selective call radio 106, and identifies messages and responses received at the system controller 102 from the selective call radio 106. Furthermore, each of one or more of the selective call radios 106 also can have a unique telephone number assigned thereto which is entered by a user sending a message via the PSTN 108, to identify the intended selective call radio 106. The telephone number is unique within the PSTN 108. A list of the assigned selective call addresses and correlated telephone numbers for the selective call radios 106 is stored in the system controller 102 in the form of a subscriber data base.

Figure 2:
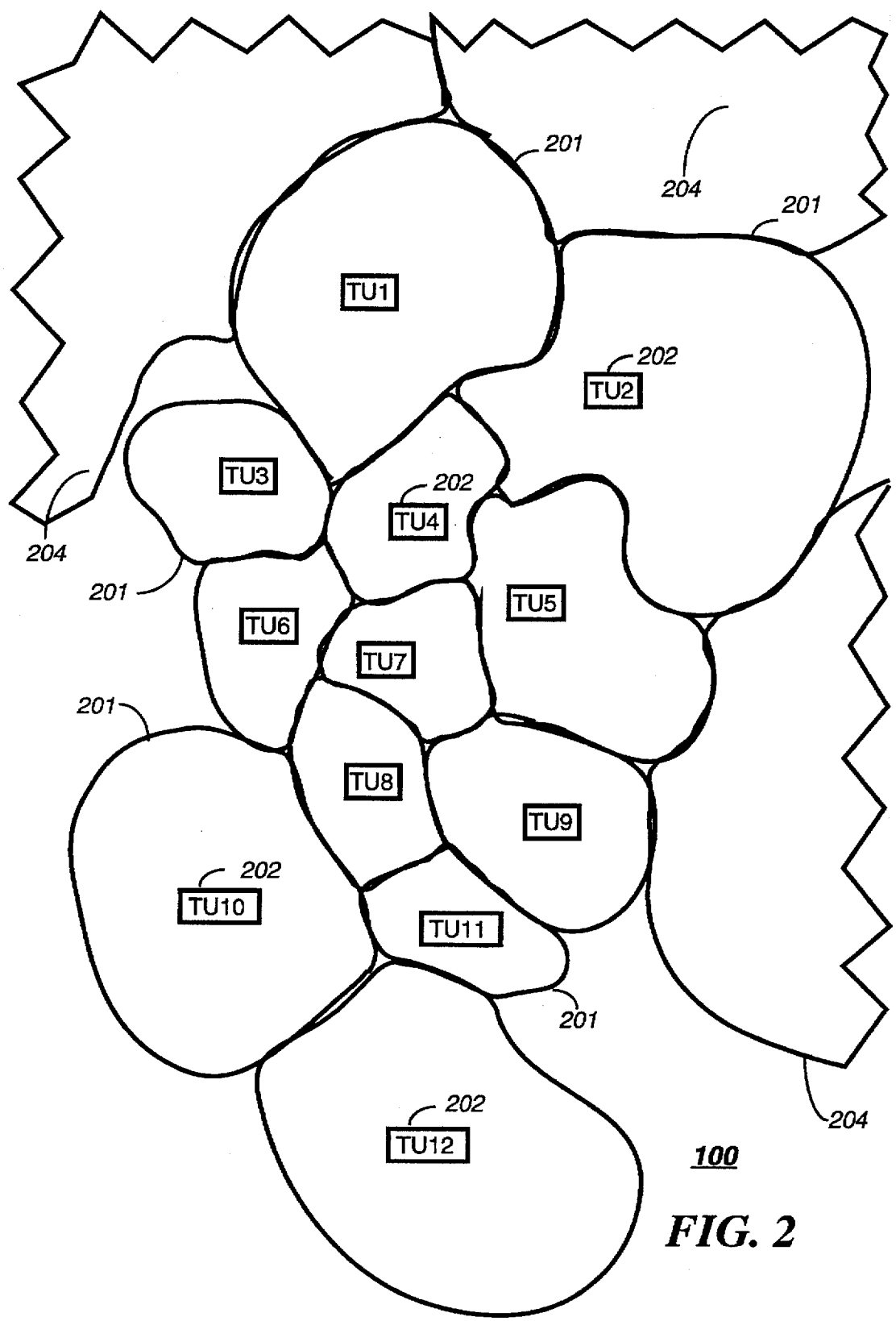
FIGS. 2 and 3 are topographic drawings of a poytion of the multicell radio communication system, in accordance with the preferred and alternative embodiments of the present invention.
Figure 3:
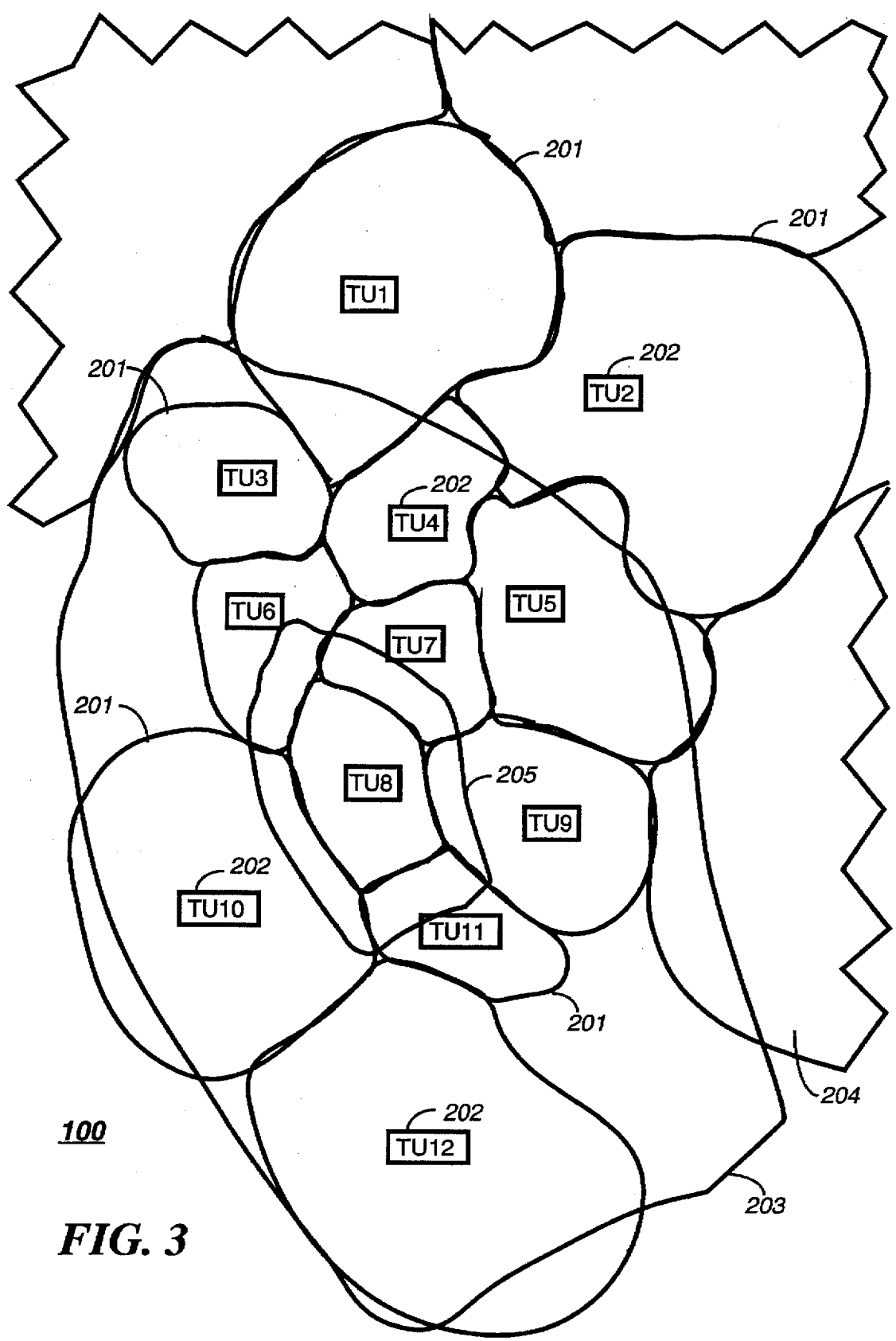

Referring to FIGS. 2 and 3, a topographic drawing of a portion of a multicell radio communication system 100 is shown, in accordance with the preferred and alternative embodiments of the present invention. The multicell radio communication system 100 comprises a set of transmission units (TUs) 202, each of which comprises at least one transmitter/receiver 103 (FIG. 1) and an associated antenna 104 (FIG. 1). In some instances, geographically separated multiple simulcasting transmitter/receivers 103 and associated antennas 104 located within the same boundary 201 constitute the transmission unit 202; in these instances, the multiple simulcasting transmitter/receivers 103 and associated antennas 104 are always operated together in a simulcast mode to transmit messages to selective call radios 106 located within boundaries of one cell. In some instances, a narrow beam antenna 104 is used with a transmitter/receiver 103 (not illustrated in FIG. 2 and 3), forming a transmission unit 202 which generates a coverage pattern which is approximately a sector portion of a circle. Several of these narrow beam transmission unitS-202 can be located at one location, generating several independent cells pointing in different directions from the one location. In accordance with the preferred embodiment of the present invention each transmission unit 202 in the set of transmission units 202 has a capability to simultaneously transmit messages on all of the radio channels assigned for use as outbound radio channels.

A cell boundary 201 is defined for each transmission unit 202. A cell boundary 201 of one transmission unit 202 is contiguous with a cell boundary 201 of another transmission unit 202 at points where the signal strength of radio signals transmitted at the same carrier frequency from both transmission units 202 have equal level. This portion of the boundary is an "equal signal" boundary. Cell boundaries 201 which are not contiguous to other boundaries 201 (which occur at the outer limits of the radio communication system 100) define a point at which a signal received from the transmission unit 202 is at a threshold for reliable reception of an information message at a selective call radio 106. The cells shown in FIG. 2 and 3 are part of a large radio communication system 100; several partial cells 204 are shown. The cells vary substantially in size, and are typically asymmetric, due to such variables as topography, adjacent transmission unit 202 locations, and patterns of the antennas 104. When transmission unit #8 (TU8 in FIGS. 2 and 3) is operated simultaneously with other TUs 202, and all are at the same carrier frequency, TU8 will interfere with signals from other TUs 202 over an area larger than the equal signal boundary 201 described above. The boundary of this interference, which is co-channel interference, is shown as co-channel interference boundary 203 (FIG. 3). When TU8 is operated simultaneously with other transmission units 202, and the other TUs are at a carrier frequency adjacent to the carrier frequency of TU8, TU8 will interfere with signals from other units over an area which is larger than the equal signal boundary 201 described above, but which is typically smaller than the co-.channel interference boundary 203. The boundary of this interference, which is adjacent channel interference, is shown as adjacent channel interference boundary 205.

Figure 4:
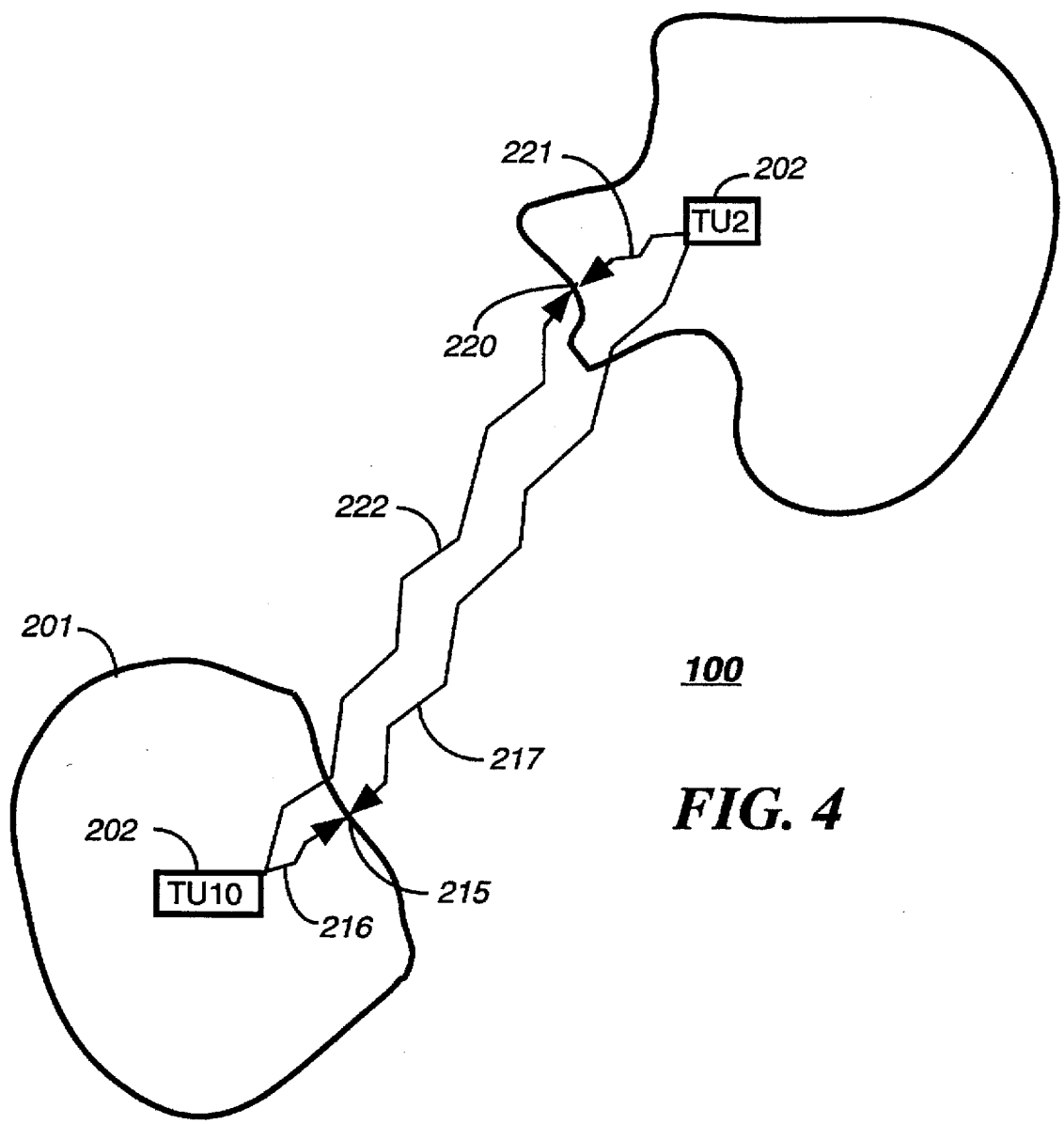
FIG. 4 shows a topographic drawing of two cells of the multicell radio communication system 100, in accordance with the preferred and alternative embodiments of the present invention.

Referring to FIG. 4, a topographic drawing of two cells of the multicell radio communication system 100 is shown, in accordance with the preferred and alternative embodiments of the present invention. For clarity, other cells which are shown in FIGS. 2 and 3 are not shown in FIG. 4. Two critical points 215, 220 are shown in FIG. 4. At each critical point 215, 220, a desired signal 216, 221 and an interfering signal (interference), 217, 222 are shown. The ratio of the signal strength, S, of the desired signal 216 transmitted from TU10 to the signal strength, I, of the interference 217, within the RF bandwidth of the desired signal, transmitted from TU2 at point 215 is $S_{10,215}/I_{2,215}$. In general, the ratio of the signal strength of a desired signal transmitted from $TU_j$ to the signal strength of an interference transmitted from $TU_i$ at any point k on or within the boundary 201 of $TU_j$ is $S_{j,k}/I_{i,k}$.

It will be appreciated that there is at least one point, p, located on the boundary 201 or inside the boundary 201 of the cell associated with any transmission unit $TU_j$ 202 generating a desired signal, and associated with a transmission unit $TU_i$ 202 generating an interference, at which the ratio $S_{j,p}/I_{i,p}$ is a minimum value of the ratio $S_{j,k}/I_{i,k}$ occurring at all other points on or in the boundary 201. The point p is a critical point for the pair of transmission units $TU_i$, $TU_j$ and the type of interference (e.g., co-channel or adjacent channel) used when determining the ratio $S_{j,p}/I_{i,p}$. When the interference is co-channel interference, the ratio $S_{j,p}/I_{i,p}$ is identified as the critical signal to interference value $SC_{i,j}$, and when the interference is adjacent channel interference, the ratio $S_{j,p}/I_{i,p}$ is identified as the critical signal to interference value $SA_{i,j}$. It will be appreciated that typically; but not always, the location of the critical points p for $SC_{i,j}$ and $SA_{i,j}$ for a given pair of transmission unit 202's are the same point. It will be further appreciated that because of the asymmetry of the cells, $SC_{i,j}$ and $SC_{j,i}$ do not typically have the same value. Similarly, $SA_{i,j}$ and $SA_{j,i}$ do not typically have the same value.

There are several techniques well known to one of ordinary skill in the art for measuring the values $SC_{i,j}$ and $SA_{i,j}$ for all the pairs of transmission units 202. One technique is to make measurements in the field during a system maintenance period, for example by measuring the signal strength of an unmodulated or modulated carrier signal at many points over the entire radio communication system 100, with only transmission unit 202 transmitting at a time, using one of two adjacent radio frequencies at a time. The field measurements are then manually entered into the system controller 102. This technique is typically the most accurate but is also very time consuming. An alternative technique is to use a radio propagation estimation tool such as the NetPlan™ propagation tool by Motorola, Inc. of Schaumburg, Ill., for estimating the critical signal to interference values $SC_{i,j}$ and $SA_{i,j}$ for all the pairs of transmission units 202 in the radio communication system 100. The propagation tool can be incorporated into the system controller 102, or the propagation tool can be connected to the system controller 102 for interactive data communication (wherein a geographic location is communicated to the propagation tool and a measurement is returned). It will be appreciated that these and any other techniques which are used to determine the critical signal to interference values $SC_{i,j}$ and $SA_{i,j}$ values are a source of the critical signal to interference values $SC_{i,j}$ and $SA_{i,j}$ for all the pairs of transmission units 202, which is described herein below as a critical signal to interference source 518 and which is coupled to a scheduler 510 (FIG. 5) of the system controller 102.

An outbound message transmitted from a $TU_j$ to a selective call radio 106 has a high probability of being received correctly (e.g., with a sufficiently low error rate for a digital message or with sufficient intelligibility for an voice message) when the ratio of strength of the signal carrying the outbound message (the desired signal) to the signal strength of all interference signals is greater than a signal to interference ratio threshold, $SI_{th}$. The threshold $SI_{th}$ is a characteristic related to a signaling sensitivity of the selective call radio 106 used to receive an outbound message. The threshold $SI_{th}$ is a parameter which is typically measured in a laboratory setup, in a manner well known to one of ordinary skill in the art.

Figure 5:
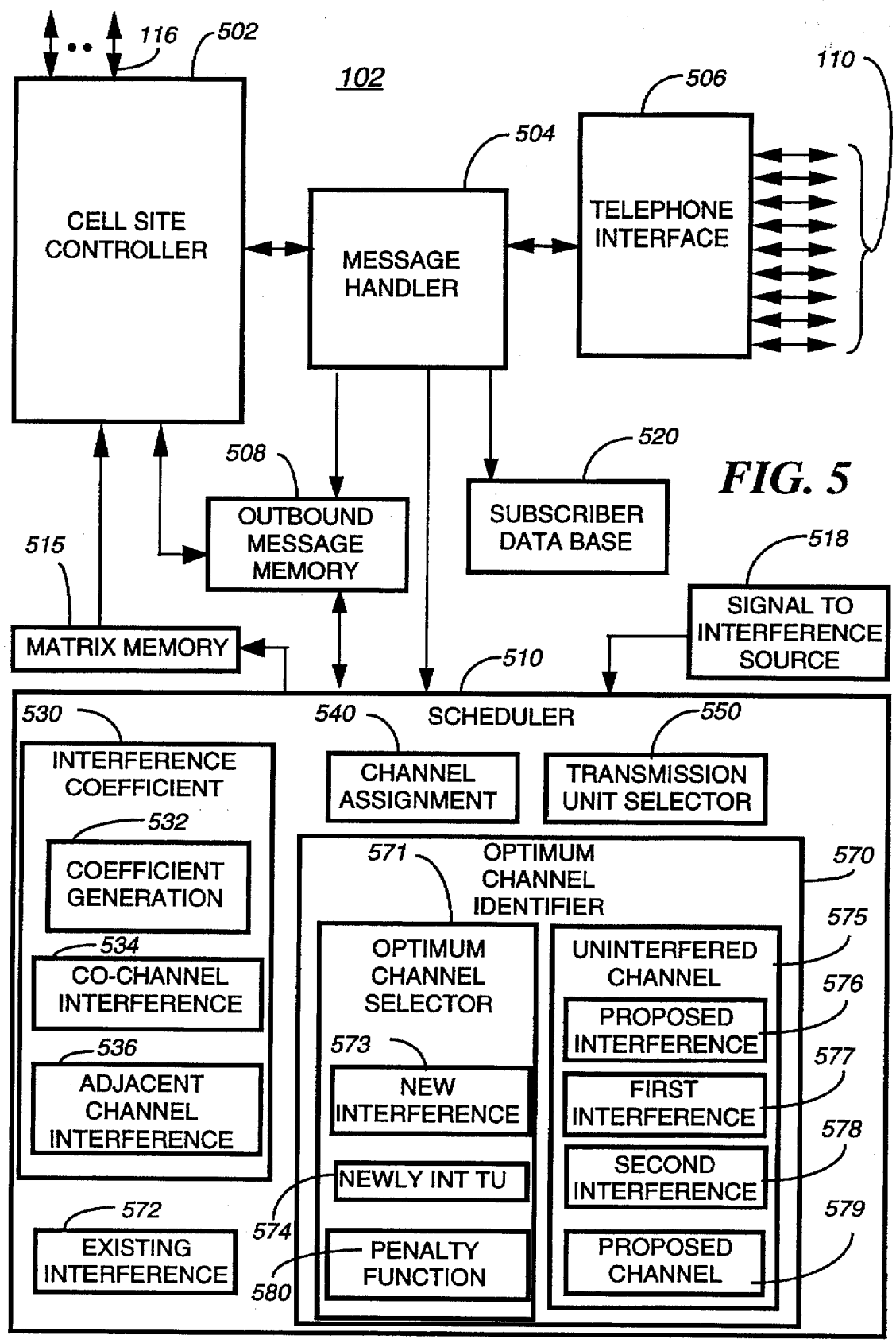
FIG. 5 shows an electrical block diagram of a system controller used in the radio communication system, in accordance with the preferred embodiment of the present invention.

Referring to FIG. 5, an electrical block diagram of the system controller 102 is shown, in accordance with the preferred and alternative embodiments of the present invention. The system controller 102 comprises a cell site controller 502, a message handler 504, an outbound message memory 508, a subscriber data base 520, a telephone interface 506, a matrix memory 515, a scheduler 510, and an optional signal to interference source 518. The cell site controller 502 is coupled to the radio frequency transmitter/receivers 103 (FIG. 1) and fixed system receivers 107 (FIG. 1) by the links 116. The cell site controller 502 transmits outbound messages including selective call addresses to the transmitter/receivers 103 and controls the transmitter/receivers 103 to transmit radio transmission cycles which include the outbound messages, using channels as scheduled in the matrix memory 515 by the scheduler 510. The cell site controller 502 also processes inbound messages from the selective call radios 106. The inbound messages are received by the transmitter/receivers 103 and fixed system receivers 107, and are coupled to the cell site controller 502. The message handler 504, which routes and processes messages, is coupled to the telephone interface 506, the subscriber data base 520, and the outbound message memory 508. The telephone interface 506 handles the switched telephone network 108 (PSTN) (FIG. 1) physical connection, connecting and disconnecting telephone calls at the telephone links 110, and routing the audio signals between the telephone links 110 and the message handler 504.

The subscriber data base 520, which is coupled to the message handler 504, stores information for each subscriber, including a correlation between a selective call address assigned to each selective call radio 106 and the telephone number used within the PSTN 108 to route messages and telephone calls to each selective call radio 106, as well as other subscriber determined preferences, such as hours during which messages are to be held back from delivery to the selective call radio 106. The outbound message memory 508 is for storing a queue of messages which are queued for delivery to at least one of the plurality of selective call radios 106, wherein each message of the queue of messages is associated with a selective call address, also stored in the outbound message memory 508, of one of the plurality of selective call radios 106 for which each message is intended. The message handler 504 queues outbound messages and the selective call addresses associated therewith during a transmission cycle, which in this example is a frame. As one example of an operation of the system controller 102, the delivery of an outbound message stored in the outbound message memory 508 is completed when the outbound message has been communicated to the intended selective call radio 106, the message is presented on a display of the selective call radio 106 by a user action, a message response is communicated back to the system controller 102 from the selective call radio 106, and the message response is identified by the message handler 504 as being a user acknowledgment generated by the selective call radio 106 specifically for the outbound message. In this example, the message handler 504 generates another message which is sent to the originator of the outbound message to notify the originator that the message has been acknowledged by the selective call radio 106.

The subscriber database 520 further stores an association of each selective call radio 106 to one of the set of transmission units 202, otherwise described as the primary location of the selective call radio 106, which identifies a transmission unit 202 which has been determined to be the most appropriate transmission unit 202 for use in transmitting messages to the selective call radio 106. Such identification is done for example, by associating a receiver at which a registration message is received from a selective call radio 106, or previous acknowledgments received from the selective call radio 106 at the receiver of the transmitter/receiver 103 of the transmission unit 202. When a message is received from the telephone interface which is intended for a selective call radio 106, the message handler 504 determines the transmission unit 202 associated with the selective call radio 106 for which the message is intended and stores the message information and the associated transmission unit 202 identification in the outbound message memory 508. The subscriber database 520 further stores an association of each selective call radio 106 to at least another one of the set of transmission units 202, identifying the transmission unit 202 which has been determined to be the next most appropriate transmission unit 202 for use in transmitting messages to the selective call radio 106 when a message is not acknowledged by an selective call radio 106 having acknowledge capability, or for example, for when a message is intended for a one way selective call radio 106 such as a non-acknowledging pager which is identified as being located in one of two cells with substantial probability.

The subscriber database further stores a mobility index associated with each selective call radio 106. The mobility index is a measurement of a likelihood that the selective call radio 106 will move from one cell to another, based on prior history of movement across cell boundaries. The mobility index is determined by selective call radio 106 from re-registration which occurs as the selective call radio 106 crosses a cell boundary. The mobility index is transmitted to the system controller 102 during inbound messages such as acknowledgments, responses, or unsolicited inbound message. Alternatively, the mobility index is determined within the system controller 102 when a selective call radio 106 is registered to new cells. The message handler associates the mobility index of a selective call radio 106 to a message when the message is stored in the outbound message memory 508. The functions of the cell site controller 502, the message handler 504, the outbound message memory 508, the subscriber data base 520, and the telephone interface 506 as described above are conventional functions embodied in conventional hardware, software, firmware, and memory sections of the system controller 102, except for the unique functions related to determining the schedule which is stored in the matrix memory 515 by the scheduler 510 described in more detail herein below.

Radio transmission cycles are used in each channel in the set of radio channels and the transmission cycles are preferably synchronized such that protocol divisions of the transmission cycles on each of the set of outbound radio channels occur simultaneously, down to the shortest division, which is a data symbol. The selective call radios 106 are multichannel radios, each capable of receiving on any one of the outbound radio channels. The system controller 102 organizes system and message information for transmission within the set of outbound radio channels, using a outbound signaling protocol based on the well known FLEX™ protocol family by Motorola, Inc. (which include the FLEX™, the REFLEX™, and the InFLEXion™ protocols). The selective call radios 106 can be commanded at the beginning of a frame of the FLEX™ protocol family, by means of an outbound message, to receive later messages on any of the outbound radio channels.

When a message is determined to be intended for a selective call radio 106, the message handler 504 stores a time of reception of the message in the outbound message memory 508. When the scheduler 510 begins scheduling message traffic for a new frame, the time difference between the reception time and the time at which scheduling is started (or any other time related to a periodic message traffic scheduling, such as the beginning of the next frame) is used to establish a latency measurement, $LA_i$, associated with each $TU_i$, which is the maximum time difference for all message traffic identified for a transmission unit 202 (and which may exceed one frame period when a message has held over more than one frame for delivery). During each frame of the FLEX™ protocol, the set of $LA_i$ is stored (captured) in the matrix memory 515 for use in the frame being scheduled.

The message handler 504 also maintains a set of traffic loads [TR] comprising a traffic load $TR_i$ for each $TU_i$. Each $TR_i$ is a measurement of the total duration of the messages stored in the outbound message memory 508 intended for selective call radios 106 having the associated $TU_i$ identified as the primary transmission unit 202. When scheduling for a frame is started, the $TR_i$ for all transmission units 202 are captured in the outbound message memory 508 as a set of traffic loads $TR_i$ (one traffic load for each transmission unit 202). The messages associated with the set of traffic measurements are termed the message traffic.

The message handler 504 also maintains a set of mobility measurements $MM_i$ for each $TU_i$. Each $MM_i$ is a measurement of the mobility indices of the messages stored in the outbound message memory 508 intended for selective call radios 106 having the associated $TU_i$ identified as the primary transmission unit 202. In accordance with the preferred embodiment of the present invention, $MM_i$ is an average of the mobility indices associated with the $TU_i$, but it will be appreciated that other measurements, such as the total median, or maximum could be used. For example, the maximum mobility index would be appropriately used as the mobility measurement when response to moving selective call radios 106 is of paramount importance. When scheduling for a frame is started, the $MM_i$ for each transmission units 202 is captured in the outbound message memory 508 as a set of mobility measurements [MM] (one mobility measurement for each transmission unit 202).

Once during each frame, after the $LA_i$, $TR_i$, and $MM_i$ are captured, the scheduler 510, which is coupled to the message handler 504, the matrix memory 515, the optional signal to interference source 518, and the outbound message memory 508, uses the $LA_i$, the $TR_i$, the $MM_i$, the values $SC_{i,j}$ and $SA_{i,j}$ for all the transmission units 202, and the threshold $SI_{th}$ to generate a schedule of channels to be used by the transmission units 202 for transmitting message traffic to the selective call radio 106 in a manner which uniquely optimizes the efficiency of message delivery, as described in more detail below. The scheduler 510 (FIG. 5) comprises an interference coefficient element 530, a channel assignment element 540, an optimum channel identifier element 570, an existing interference element 572, and a transmission unit selector element 550.

System controller 102 is preferably a model MPS2000® paging terminal manufactured by Motorola, Inc., of Schaumburg Ill., modified with unique firmware elements in accordance with the preferred embodiment of the present invention, as described herein. The cell site controller 502, the message handler 504, the outbound message memory 508, the subscriber data base 520, the telephone interface 506, the matrix memory 515, the scheduler 510, and the optional signal to interference source 518 are preferably implemented within portions of the model MPS2000® paging terminal which include, but are not limited to those portions providing program memory, a central processing unit, input/output peripherals, and a random access memory. The system controller alternatively could be implemented using a model E09PED0552 PageBridge® paging terminal manufactured by Motorola, Incorporated of Schaumburg, Ill. The subscriber data base 520, the outbound message memory 508, and the matrix memory 515 can alternatively be implemented as magnetic or optical disk memory, which can alternatively be external to the system controller 102.

Figure 11:
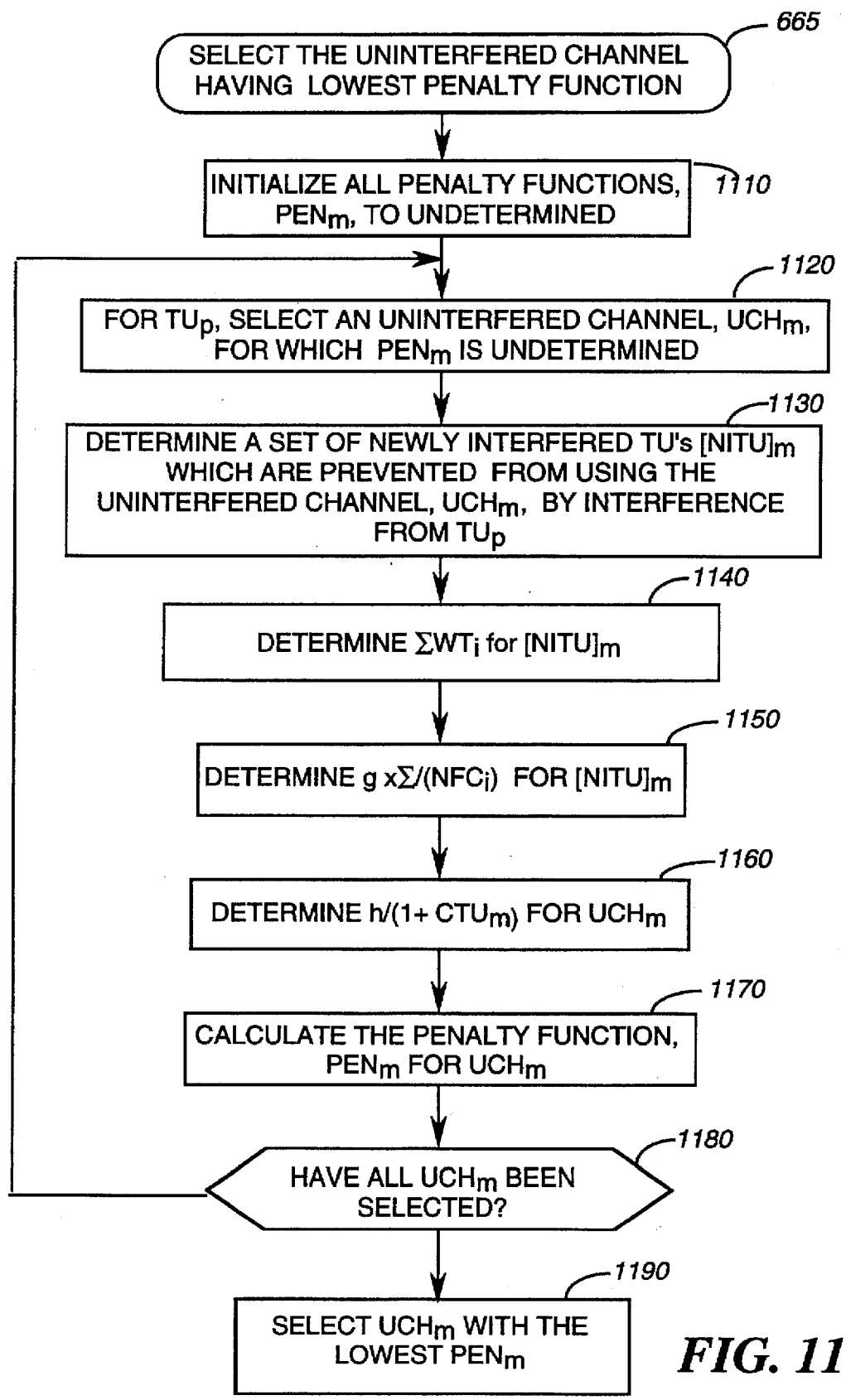
Figure 12:
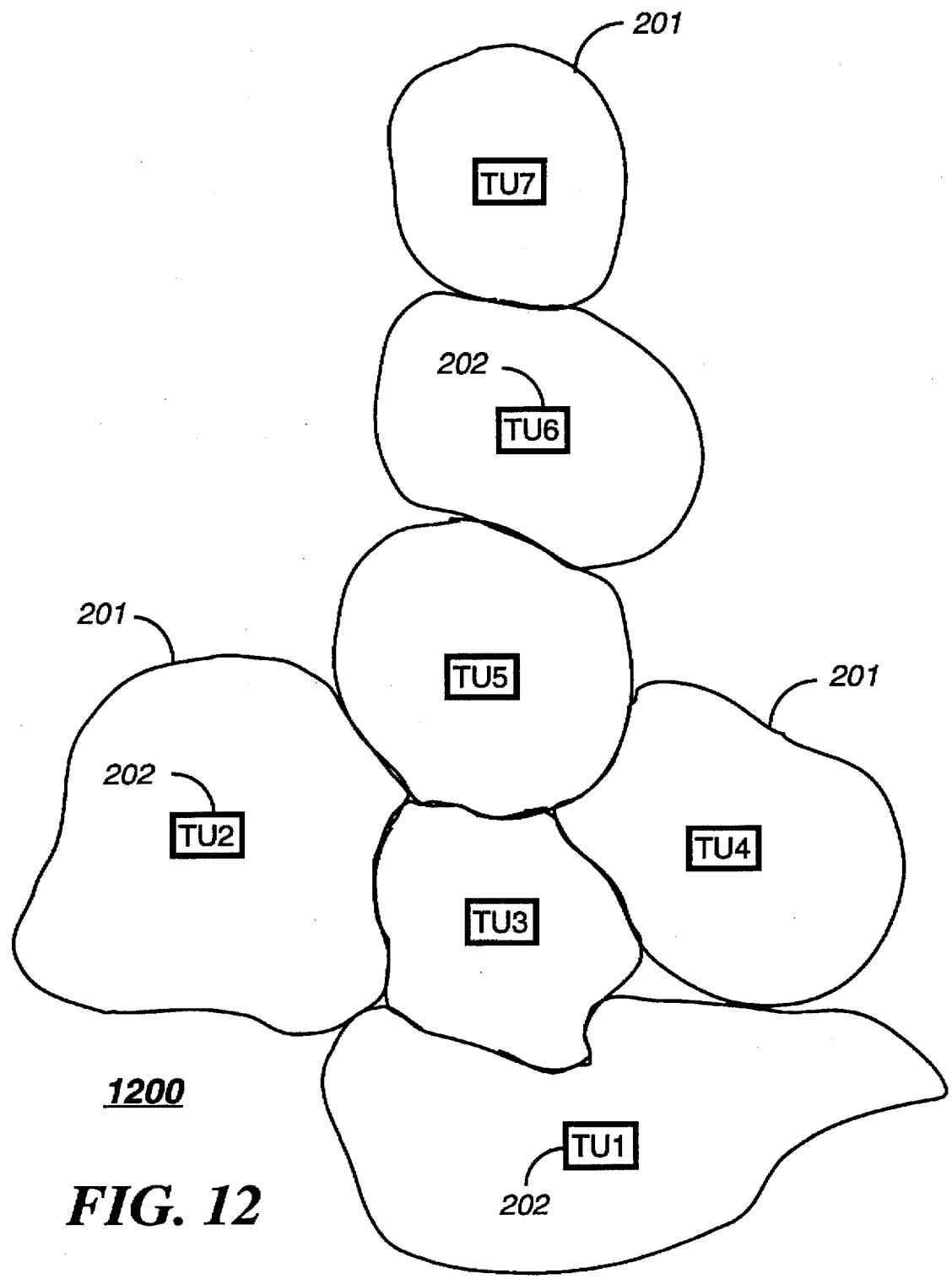
FIG. 12 shows a topographic drawing of an implementation of the radio communication system, in accordance with the preferred embodiment of the present invention.

Referring to FIGS. 6–11, a flow chart of a method used in the system controller 102 for scheduling the message traffic for transmission to the plurality of selective call radios 106 in the radio communication system 100 is shown, in accordance with the preferred embodiment of the present invention. Referring to FIG. 12, a topographic drawing of one implementation 1200 of radio communication system 100 is shown, which is used below as an example for use in describing the method and apparatus for scheduling the message traffic and channels, in accordance with the preferred embodiment of the present invention. FIGS. 6–11 are described in conjunction with FIG. 12 to describe in more detail the method and apparatus for scheduling the message traffic and channels. The radio communication system 1200 (FIG. 12) differs from the radio communication system 100 substantially only in the number and topography of the cells. The radio communication system 1200 (FIG. 12) comprises seven transmission units 202 numbered from TU1 to TU7.

At step 615 sets of interference coefficients, [C] and [A], which characterize transmission interference between pairs of transmission units in the set of transmission units, and a set of damage measurements [WT] for each $TU_i$, are determined by the interference coefficient element 530 (FIG. 5), which comprises a coefficient generation element 532, a co-channel interference element 534, and an adjacent channel interference element 536. Each damage measurement, $WT_i$, in [WT] is a measurement of the difficulty of assigning the transmission unit 202 for transmitting due to interference from other transmission units 202. The higher the value of $WT_i$, the harder it is to assign a channel to $TU_i$. The coefficient generation element 532 is coupled to the signal to interference source 518, the co-channel interference element 534, and the adjacent channel interference element 536. The critical signal to interference values $SC_{i,j}$ are received by the coefficient generation element 532 from the signal to interference source 518. (Several examples of a signal to interference source 518 are described above with reference to FIG. 4.)

Step 615 (FIG. 6) is shown in more detail in FIG. 7. At step 720 (FIG. 7), the coefficient generation element 532 generates a co-channel interference coefficient for each of the critical signal to interference values $SC_{i,j}$ based on the threshold characteristic $SI_{th}$ by the following relationships:

$$C_{i,j} = 10^{-[\frac{SC_{i,j}-SI_{th}}{10}]}; \quad i \ne j \qquad (1)$$

$$C_{i,j} = 0; \quad i = j \qquad (2)$$

The implication of equation (2) is that the co-channel interference coefficient does not describe interference of a channel to itself. However, as described in more detail below, when a channel is assigned to a transmission unit 202, the channel is not free and cannot be reassigned to the transmission unit 202.

It will be appreciated that the co-channel interference coefficient is a measure of the co-channel interference at one transmission unit $TU_j$ generated by another transmission unit $TU_i$. When, for instance, $SC_{i,j}$ is 3 decibels (dB) greater than $SI_{th}$, $C_{i,j}$ has a value of 0.5. When $C_{i,j}$ is less than 1.0, the likelihood of interference is low; that is, the probability that a message will be received at $TU_j$ is high when $TU_i$ is also transmitting on the same channel.

Also, at step 720 (FIG. 7), the co-channel interference element 534 (FIG. 5) formulates a set of the co-channel interference coefficients which includes one subset of co-channel interference coefficients for each transmission unit. The co-channel interference element 534 (FIG. 5) is coupled to the coefficient generation element 532 and the matrix memory 515. Each co-channel interference coefficient in a subset of co-channel interference coefficients represents a measure of co-channel interference at one transmission unit which is generated from another of the transmission units, wherein the one transmission unit is common for all co-channel coefficients in the subset.

At step 730, the coefficient generation element 532 (FIG. 5) generated an adjacent channel interference coefficient from each of the critical signal to interference values $SC_{i,j}$ and the threshold characteristic $SI_{th}$, by the following relationship:

$$A_{i,j} = 10^{-[\frac{SA_{i,j}-SI_{th}}{10}]}; \quad \text{for all } i,j \qquad (3)$$

It will be appreciated that the adjacent channel interference coefficient is a measure of the adjacent channel interference at one transmission $TU_j$ generated by any transmission unit $TU_i$ (that is, the transmission unit generating the adjacent channel interference can be the same transmission unit receiving the signal, or i=j). When, for instance, $SA_{i,j}$ is 3 decibels (dB) greater than $SI_{th}$, $A_{i,j}$ has a value of 0.5. When $A_{i,j}$ is less than 1.0, the likelihood of interference is low; that is, the probability that a message will be received at $TU_j$ is high when $TU_i$ is also transmitting on an adjacent channel.

Also, at step 730 (FIG. 7), the adjacent channel interference element 536 (FIG. 5) formulates a set of the adjacent channel interference coefficients from the adjacent channel interference coefficients in a manner analogous to that of the co-channel interference element 534, except that the value for adjacent channel interference to a transmission unit 202 from the same transmission unit 202, $A_{i,j}$, is not necessarily zero. The adjacent channel interference element 536 (FIG. 5) is coupled to the coefficient generation element 532 and the matrix memory 515.

It will be appreciated that, by using the relationships given above for the coefficients $C_{i,j}$ and $A_{i,j}$, when appropriately selected coefficients (co-channel and adjacent coefficients) for transmission units 202 which are assigned to transmit on a channel which interferes (on a co-channel or adjacent channel basis) with a channel assigned to a given transmission unit 202, are added together, the sum is a good measure of the total interference received at the given transmission unit 202. When the sum is greater than a first predetermined value, which in accordance with the preferred embodiment of the present invention is 1.0, messages sent to the given transmission unit 202 can be interfered with sufficiently that the messages are not received reliably. This is particularly likely at the critical points. The likelihood of interference is typically less probable at other points. A conservative approach, which is used in accordance with the preferred embodiment of the present invention, is that the transmission unit 202 is interfered with whenever the sum is greater than 1.0. It will be further appreciated that the mathematical relationship can be modified and/or the criteria can be modified in a variety of ways which would still result in a measurement, based on interference coefficients for the pairs of transmission units derived from critical signal to interference measurements (or calculations, when a propagation tool is used) which can be used to evaluate interferences between pairs of transmission units 202 as described herein, for the purpose of optimizing the delivery of message traffic by assigning channels to transmission units 202.

It will be further appreciated that the interference coefficients $A_{i,j}$ and $C_{i,j}$ may be determined in accordance with a first alternative embodiment of the present invention as binary values, in which a first value, 0, indicates that substantial interference is not likely to occur between the pair of transmission units 202. Otherwise, a value of 1 is assigned. In this approach, substantial interference can be defined as interference approximately equivalent to an amount which generates a value of, for example, 0.5 in equation (1) or (3). Alternatively, a value of 1 can be assigned, for example, based on the number and distance of transmission units 202 which can generate co-channel transmissions. This approach reduces the complexity of determining the coefficients and performing the calculations, but reduces the amount of improvement afforded by the technique.

At step 740 (FIG. 7), the co-channel interference element 534 formulates a set of the damage measurements of interference [WT] in which each $WT_i$ is a sum of all the co-channel interference coefficients in a subset of co-channel interference coefficients plus all the adjacent channel interference coefficients in a subset of adjacent channel interference coefficients. Mathematically, each $WT_i$ is determined by:

$$WT_i = \sum_{k=1}^{N} C_{k,i} + A_{k,i} \qquad (4)$$

The set of co channel interference coefficients [C] the set of adjacent channel coefficients [A] and the set of [WT] are stored as matrices [C], [A], and [WT] in the matrix memory 515 (FIG. 5).

Table 1 is an example of the matrix [A] for the radio communication system 1200, which in this example is a 7×7 matrix.

Table 2 is an example of the matrix [C] for the radio communication system 1200, which in this example is a 7×7 matrix. It will be appreciated that the co-channel coefficients $C_{i,i}$ are set to zero, in accordance with the preferred embodiment of the present invention.

TABLE 1

| [A] | TU1 | TU2 | TU3 | TU4 | TU5 | TU6 | TU7 |
| --- | --- | --- | --- | --- | --- | --- | --- |
| TU1 | 0.50 | 0.50 | 0.50 | 0.50 | 0.03 | 0.00 | 0.00 |
| TU2 | 0.20 | 0.50 | 0.50 | 0.08 | 0.08 | 0.01 | 0.00 |
| TU3 | 1.00 | 0.13 | 0.50 | 0.50 | 0.50 | 0.03 | 0.00 |
| TU4 | 2.00 | 0.05 | 0.79 | 0.50 | 0.08 | 0.01 | 0.00 |
| TU5 | 0.03 | 0.08 | 0.50 | 0.05 | 0.50 | 0.50 | 0.03 |
| TU6 | 0.01 | 0.02 | 0.01 | 0.00 | 0.16 | 0.50 | 0.50 |
| TU7 | 0.00 | 0.00 | 0.00 | 0.00 | 0.05 | 0.79 | 0.50 |

TABLE 2

| [C] | TU1 | TU2 | TU3 | TU4 | TU5 | TU6 | TU7 |
| --- | --- | --- | --- | --- | --- | --- | --- |
| TU1 | 0.00 | 126 | 126 | 126 | 7.94 | 0.50 | 0.03 |
| TU2 | 50 | 0.00 | 126 | 20 | 20 | 1.26 | 0.04 |
| TU3 | 251 | 32 | 0.00 | 126 | 126 | 7.94 | 0.50 |
| TU4 | 501 | 13 | 200 | 0.00 | 20 | 1.26 | 0.04 |
| TU5 | 6.31 | 20 | 126 | 13 | 0.00 | 126 | 7.94 |
| TU6 | 1.58 | 3.98 | 3.16 | 0.40 | 40 | 0.00 | 126 |
| TU7 | 0.06 | 0.13 | 0.25 | 0.03 | 13 | 200 | 0.00 |

Table 3 is an example of the matrix [WT] for the radio commtmication system 1200, which in this example is a 1×7 matrix.

TABLE 3

| [WT] | | | | | | |
| --- | --- | --- | --- | --- | --- | --- |
| TU1 | TU2 | TU3 | TU4 | TU5 | TU6 | TU7 |
| 814 | 195 | 583 | 286 | 228 | 338 | 135 |

In general, a radio communication system 100 having N transmission units 202 has matrices [C] and [A] of size N x N, and a [WT] matrix of size 1 x N. It will be appreciated that each damage measurement WTi is a measurement of difficulty of assigning the transmission unit 202 to any channel, without knowledge of which channels are (or will be) assigned to other transmission units 202, and that the relationship can be modified in a variety of ways which would still result in a measurement based on interference coefficients for the pairs of transmission units derived from critical signal to interference values (measurements, in the case of field measurements, or calculations, when a propagation tool is used) which can be used to evaluate the difficulty of assigning a channel to a transmission unit 202 as described herein, for the purpose of selecting a proposed transmission unit 202 for which to schedule message traffic on a channel, as described below. For example, $WT_i$ could alternatively be the number of transmission units 202 for which $C_{k,i}+A_{k,i}$ is greater than or equal to a predetermined threshold, such as 0.3.

At step 620 (FIG. 6), a new frame period is started. The messages which have received during the most recent previous frame, plus any messages received before the most recent frame, which were not delivered in the most recent frame, have been stored in the outbound message memory 508. The messages have been received via the telephone interface 506 (FIG. 5) or another input device, such as the cell site controller 502 (in the case where a message is received from one selective call radio 106 for delivery to another selective call radio 106).

At step 625 (FIG. 6), the traffic loads are captured by the message handler 504 and stored in the outbound message memory 508 as a 1 x N matrix, [TR]. The traffic load matrix for the example being described herein is shown in Table 4.

TABLE 4

| [TR] | | | | | | |
| --- | --- | --- | --- | --- | --- | --- |
| TU1 | TU2 | TU3 | TU4 | TU5 | TU6 | TU7 |
| 35 | 45 | 30 | 12 | 5 | 45 | 90 |

Also at step 625 (FIG. 6), the cell site controller 502 (FIG. 5) captures the latency, $LA_i$, and mobility measurement, $MM_i$, for each transmission unit, $TU_i$, in the set of transmission units as described above with reference to FIG. 5, and stores them in the matrix memory 515.

At step 630 (FIG. 6), the channel assignment element 540 (FIG. 5), which is coupled to the matrix memory 515, initializes a set of transmission unit assigmnents compriping channel assignments for each of the set of transmission units, as a channel assignment matrix [CAM]. While the schedule of outbound traffic channels and message traffic is being determined, the channel assigrument element 510 updates [CAM] indicating unassigned channels by a zero in the matrix and assigned channels by a one. [CAM] is a N x M matrix, where N is the number of transmission units 202 in the radio communication system 100, and M is the number of channels assigned for use by the radio communication system 100. In the example being described herein, N is 7 and M is 4. When the [CAM] is initialized at step 630 (FIG. 6), all channels are unassigned. Table 5 shows the [CAM] for the example being described herein, after initialization.

TABLE 5

| [CAM] | CH1 | CH2 | CH3 | CH4 |
| --- | --- | --- | --- | --- |
| TU1 | 0 | 0 | 0 | 0 |
| TU2 | 0 | 0 | 0 | 0 |
| TU3 | 0 | 0 | 0 | 0 |
| TU4 | 0 | 0 | 0 | 0 |
| TU5 | 0 | 0 | 0 | 0 |
| TU6 | 0 | 0 | 0 | 0 |
| TU7 | 0 | 0 | 0 | 0 |

It will be appreciated that the [CAM] and other matrices described herein (both above and below) can be stored using data relationships well known to one of ordinary skill in the art such as lists, indexed variables, vectors, sets of data, etc., instead of the matrices described herein.

At step 632, the existing interference element 572, which is coupled to the matrix memory 515, determines a set of existing interference values, [EI], for each channel at which the transmission unit 202 can be assigned to transmit (which in this example, is four channels). For each transmission unit 202, $TU_j$, each existing interference value, $EI_j$ measures the interference received at $TU_j$ from all assigned transmission units 202 (transmission units 202 having channels assigned in [CAM]). For each $TU_j$, the existing interference at channel m, $EI_{j,m}$, is determined as follows:

$$EI_{j,m} = \sum_{k \in Sc(j)} C_{k,j} + \sum_{k \in Sa(j)} A_{k,j} \quad (5)$$

The first term represents the interference received from "co-channel interferers", which are assigned transmission units 202 having the same channel assigned as the channel, m, for which existing interference is being determined for each $TU_j$. In the first term, the co-channel interference coefficients (shown as $C_{k,j}$) of the co-channel interferers (shown as k∈ Sc(j) ) are summed. The second term represents the interference received from "adjacent channel interferers", which are assigned transmission units 202 having a channel assigned which is adjacent to the channel, m, for which existing interference is being determined for each $TU_j$. In the second term, the adjacent channel interference coefficients (shown as $A_{k,j}$) of the adjacent channel interferers (shown as k∈ Sc(j) ) are summed.

As indicated above, the terms $EI_{j,m}$ are determined for each channel, $CHI_m$, for each $TU_j$.

At step 635, the channel assignment element 540 (FIG. 5) determines a number of free channels for each transmission unit 202, $NFC_i$. Each $NFC_i$, which is stored in a matrix [NFC], is determined by the number of channels for which the term $EI_{j,m}$ is less than the first predetermined value, (1.0), and for which the channel is not assigned to $TU_j$.

It will be appreciated that when [CAM] is initialized, there are no assigned transmission units 202, so that the number of free channels for each transmission unit 202 equals the number of channel which are usable by each transmission unit 202. In the present example, therefore, each $NFC_i$ is 4. When a channel is assigned, the existing interference element 572 updates [EI] (which is an N x M matrix) and the channel assignment element 540 updates [NFC], which is a 1 x N matrix.

Table 6 shows [NFC] for the example being described herein, after initialization.

TABLE 6

| | | | NFC | | | |
|---|---|---|---|---|---|---|
| TU1 | TU2 | TU3 | TU4 | TU5 | TU6 | TU7 |
| 4 | 4 | 4 | 4 | 4 | 4 | 4 |

At steps 640 to 650, the transmission unit selector element 550, which is coupled to the matrix memory, determines a proposed transmission unit, $TU_p$, using the group of transmission unit parameters described above consisting of $LA_i$, $TR_i$, $NFC_i$, $WT_i$, and $MM_i$. In accordance with the preferred embodiment of the present invention, the proposed transmission unit, $TU_p$, is determined by a maximum priority function, $PRI_{max}$, of a set of priority functions [PRI]. Each priority function, $PRI_i$, corresponds to a transmission unit in the set of transmission units, and each priority function is determined, at step 640, by:

$$PRI_i = WT_i + \frac{a}{1+NFC_i} + b(TR_i) + c(LA_i) + d(MM_i) \quad (6)$$

The values a, b, c, and d are predetermined constants, which in accordance with the preferred embodiment of the present invention are calculated to give substantially equal weights to each term when the corresponding variable $LA_i$, $TR_i$, $NFC_i$, $WT_i$, or $MM_i$ is at the extreme value which maximizes $PRI_i$. It will be appreciated that this priority function gives higher weight for a transmission unit 202 which is generally more heavily interfered with by other transmission units 202 ($WT_i$), which has fewer free channels available ($NFC_i$), which has more message traffic ($TR_i$), which has higher (worse) latency ($LA_i$), and which has higher mobility ($MM_i$). It will be further appreciated that the constants a, b, c, and d can be set to other values when some of the parameters are more or less important than as determined in accordance with the preferred embodiment of the present invention. For example, increasing latency may be such a vital issue that a larger value than described above is more appropriate in a particular system. As another example, certain parameters, such as the message traffic and mobility measurement may not be available or may be so unimportant that they are not included in the calculation. It will also be appreciated that the priority function could be defined such that the sensitivity of a term to variation is different. For example, an exponential form, such as $(LAi)^2$, can be used when the impact of the variable expected or determined to be exponential. As another example, a term which has less affect as the magnitude of the transmission unit parameter gets larger can be multiplied by a negative coefficient or used in a reciprocal form (e.g., the term $NFC_i$ in equation (5)). Terms having products or other relationships of the parameters $LA_i$, $TR_i$, $NFC_i$, $WT_i$, or $MM_i$ may also be appropriate in some circumstances. The $PRI_i$ function is therefore alternatively stated as simply being a function of the transmission unit parameters, or:

$$PRI_i = f(WT_i, NFC_i, TR_i, LA_i, MM_i) \quad (6)$$

The transmission unit parameters for the example being described and the set of priority functions resulting therefrom after the initialization of [CAM], using the constants at the values defined above are shown below in Table 7. In the particular example being described herein, the $MM_i$ parameter is not of substantial significance, and is therefore not included.

TABLE 7

| | [LA] | [TR] | [NFC] | [WT] | [PRI] |
|---|---|---|---|---|---|
| TU1 | 0.8 | 35 | 4 | 814 | 1510 |
| TU2 | 0.3 | 45 | 4 | 195 | 846 |
| TU3 | 1.5 | 30 | 4 | 583 | 1424 |
| TU4 | 1.0 | 12 | 4 | 286 | 829 |
| TU5 | 0.2 | 5 | 4 | 228 | 490 |
| TU6 | 0.1 | 45 | 4 | 338 | 935 |
| TU7 | 1.5 | 90 | 4 | 135 | 1518 |

In the example shown in Table 7, the maximum $WT_i$ is 814, so, in order to substantially equalize the weight of each term in equation (6), a=814 (1+0)=814. Similarly, b=814/90=9.04, and c=814/3.0=271. (The largest value of the term $a/(1+NFC_i)$ is when $NFC_i$=0. A largest expected value for the latency is established to be 3.0, even though it does not occur in this example of scheduling a frame of traffic. The largest expected value for $TR_i$ is 90.) The largest $PRI_i$ is $PRI_7$, so TU7 becomes $TU_p$.

At step 645 (FIG. 6), a test is made by the transmission unit selector element 550 to determine when any message traffic remains for which a channel is not yet assigned. When no traffic remains for any transmission unit 202 (i.e., when all $TR_i$ are 0) the process continues at step 910, shown in FIG. 9, which is described herein below. When traffic does remain for any transmission trait 202, the transmission unit 202 having the highest PRIi and non-zero TRi is selected by the transmission unit selector element 550 at step 650 as the proposed channel. In this example, TU7 is selected a,s the proposed transmission unit, $TU_p$, after initialization.

The optimum channel identifier element 570 (FIG. 5), which is coupled to the matrix memory 515, and which determines an optimum channel for the proposed transmission unit, $TU_p$, from the set of transmission unit channel assignments and the set of interference coefficients, comprises an uninterfered channel element 575 and an optimum channel selector element 571.

At step 655 (FIG. 6), the uninterfered channel element 575 (FIG. 5), which is coupled to the matrix memory 515, determines a set of uninterfered channels. The uninterfered channel element 575 (FIG. 5) comprises a proposed interference element 576, a first interference element 577, a second interference element 578, and a proposed channel element 579. Each uninterfered channel is an outbound radio channel for which a calculation based on the set of transmission unit channel assignments, the proposed transmission unit, $TU_p$, and the set of interference coefficients results in an interference level which represents interference from all assigned and the proposed transmission unit and which is below a predetermined value at all assigned transmission units and $TU_p$. This is described in more detail with reference to steps 1010 to 1045 (FIG. 10) of the flow chart.

At step 1010, the proposed interference element 577 (FIG. 5), which is coupled to the matrix memory 515, determines a proposed interference value for a proposed channel, which is a channel in the set of outbound radio channels not assigned for use by the proposed transmission unit, $TU_p$. Each proposed interference value, which is represented by the sum of a proposed co-channel interference value ($\Sigma C_p$) and a proposed adjacent channel interference value ($\Sigma A_p$), represents interference received at the proposed transmission unit, $TU_p$, from all other transmission units 202 in the set of transmission units having an interfering assigned channel. The proposed co-channel interference value $\Sigma C_p$ is determined from a sum of $C_{i,j}$ selected from [C]. The $C_{i,j}$ selected from [C] are those $C_{i,j}$ associated with any $TU_i$ which have the proposed channel identified as an assigned channel in [CAM], and for which $TU_j$ is the proposed transmission unit, $TU_p$. The transmission units 202 associated with the selected $C_{i,j}$ are named the co-channel interference transmission units for the $TU_p$. The proposed adjacent channel interference value $\Sigma A_p$ is determined from the sum of $A_{i,j}$ selected from [A]. The $A_{i,j}$ selected from [A] are those $A_{i,j}$ associated with any $TU_i$ which have a channel adjacent to the propbsed channel identified as an assigned channel in [CAM], and for which $TU_j$ is the proposed transmission unit, $TU_p$. The transmission units 202 associated with the selected $A_{i,j}$ are named the. adjacent channel interference transmission units.

Several sets of values are shown in Tables 8, 9, 10, and 11 below, for the example being described herein, after three channel assignments have been made. The channel assignment matrix [CAM] is shown in Table 8. The existing interference values, [EI], and the number of free channels, [NFC], are shown in Table 9. The transmission unit 202 parameters and [PRI] are shown in Table 10. From Table 10, TU7 is the $TU_i$ having the highest value of $PRI_i$ and traffic greater than zero, and therefore $TU_p$ is TU7. The proposed co-channel and adjacent channel interference values for $TU_p$ on channel two are shown in Table 11. Tables 1 and 2 are used for [C] and [A] to obtain the values in Tables 9, 10 and 11 below.

TABLE 8

| [CAM] | CH1 | CH2 | CH3 | CH4 |
|---|---|---|---|---|
| TU1 | 1 | 0 | 0 | 0 |
| TU2 | 0 | 0 | 0 | 0 |
| TU3 | 0 | 0 | 1 | 0 |
| TU4 | 0 | 0 | 0 | 0 |
| TU5 | 0 | 0 | 0 | 0 |
| TU6 | 0 | 0 | 0 | 0 |
| TU7 | 1 | 0 | 0 | 0 |

TABLE 9

| [EI] | CH1 | CH2 | CH3 | CH4 | [NFC] |
|---|---|---|---|---|---|
| TU1 | 0.06 | 1.50 | 251 | 1.00 | 0 |
| TU2 | 126 | 0.63 | 32 | 0.13 | 2 |
| TU3 | 126 | 1.00 | 0.00 | 0.50 | 1 |
| TU4 | 126 | 1.00 | 126 | 0.50 | 1 |
| TU5 | 21 | 0.58 | 126 | 0.50 | 2 |
| TU6 | 200 | 0.83 | 7.94 | 0.03 | 2 |
| TU7 | 0.03 | 0.50 | 0.50 | 0.00 | 3 |

TABLE 10

|  | [LA] | [TR] | [NFC] | [WT] | [PRI] |
|---|---|---|---|---|---|
| TU1 | 0.8 | 0 | 0 | 814 | 1845 |
| TU2 | 0.3 | 45 | 2 | 195 | 955 |
| TU3 | 1.5 | 0 | 1 | 583 | 1397 |
| TU4 | 1.0 | 12 | 1 | 286 | 1073 |
| TU5 | 0.2 | 5 | 2 | 228 | 598 |
| TU6 | 0.1 | 45 | 2 | 338 | 1043 |
| TU7 | 1.5 | 40 | 3 | 135 | 1107 |

TABLE 11

|  | $C_{i,1}$ Ch2 | $A_{i,1}$ Ch1 | $A_{i,1}$ Ch3 |
|---|---|---|---|
| TU1 | 0.00 |  |  |
| TU2 |  |  |  |
| TU3 |  |  | 0.00 |
| TU4 |  |  |  |
| TU5 |  |  |  |
| TU6 |  |  |  |
| TU7 |  |  | 0.50 |

It will be observed in Table 9 that there are three transmission units 202 (TU1, TU3, and TU7) which are assigned transmission units 202, that is, transmission units 202 assigned to transmit mess.age traffic on at least one channel. When TU7 is the proposed transmission unit 202 and channel 2 is a proposed channel, then any transmission units 202 having channel two as an assigned channel are co-channel transmission units 202. There are none in the example described by Table 9. When TU7 is the proposed transmission unit 202 and channel 2 is a proposed channel, then transmission units having channels one or three as an assigned channel are adjacent channel transmission units 202. There are three in the example as described by Table 9 (TU1, TU3, and TU7).

From Table 11, it can been seen that $\Sigma C_p$ is 0 and $\Sigma A_p$ is 0.5, and the proposed interference value ($\Sigma C_p + \Sigma A_p$) is therefore 0.5. The adjacent channels for channel two are channels one and three. The proposed interference element 576 repeats the determination of $\Sigma C_p$ and $\Sigma A_p$ for all channels not already assigned to the proposed transmission unit, $TU_p$.

At step 1015 (FIG. 10), the first interference element 577 (FIG. 5), which is coupled to the matrix memory 515, determines two sets of first interference values, [CEI] and [AEI], for the proposed channel. Each first interference value, $CEI_j$ and $AEI_j$, represents interference received at an assigned transmission unit 202 which has an assigned channel which is either the proposed channel or adjacent to the proposed channel. The interference is from assigned transmission units 202, as described below.

The first interference co-channel values, $CEI_j$, are determined by the calculation:

$$CEI_j = \sum_{k \in Sc(j)} C_{k,j} + \sum_{k \in Sa(j)} A_{k,j} \quad (7)$$

The first interference co-channel values, CEIj, are the $EI_{j,m}$ of co-channel transmission units 202, $TUc_j$. Each co-channel transmission unit 202, $TUc_j$, is a transmission unit 202 to which the proposed channel has been assigned (other than $TU_p$, which has not yet been assigned the proposed channel). The summation terms represent interference from assigned transmission units which have assigned channels which are co-channel or adjacent channel to the co-channel transmission units 202.

The first interference adjacent channel values, $AEI_j$, are determined by the calculation:

$$AEI_j = \sum_{k \in Sc(j)} C_{k,j} + \sum_{k \in Sa(j)} A_{k,j} \quad (8)$$

The first interference adjacent channel values, $AEI_j$, are the $EI_{j,m}$ of adjacent channel transmission units 202, $TUa_j$. Each adjacent channel transmission unit 202, $TUc_j$, is a transmission unit 202 to which a channel adjacent to the proposed channel has been assigned. The summation terms represent interference from transmission units which have assigned channels which are co-channel or adjacent channel to the adjacent channel transmission units 202.

Thus, the first interference values represent interference received at transmission units 202 which are potentially affected by assigning the proposed channel to $TU_p$. The first interference values for channel three in the example being described herein, when the [CAM] has the channel assignments shown in Table 9 above, are shown in Table 12 below (Tables 1 and 2 are used for [C] and [A]).

TABLE 12

|     | CEI Ch2 | AEI Ch1 | AEI Ch3 |
| --- | --- | --- | --- |
| TU1 |  | 0.06 |  |
| TU2 |  |  |  |
| TU3 |  |  | 0.00 |
| TU4 |  |  |  |
| TU5 |  |  |  |
| TU6 |  |  |  |
| TU7 |  | 0.03 |  |

In the example shown in Table 12, for proposed channel two, there are no transmission units 202 having channel 2 assigned, so there are no $CEI_j$. TU1 and TU7 are assigned to channel 1 and TU3 is assigned to channel three, so there are three $AEI_j$. The three $AEI_j$ values are determined from $EI_{j,m}$ values in Table 9, specifically $EI_{1,1}$; $EI_{7,1}$; and $EI_{3,3}$.

At step 1020 (FIG. 10) the second interference element 578 (FIG. 5), which is coupled to the matrix memory 515 (FIG. 5), determines two sets of corresponding second interference values, [CC] and [AC], for the proposed channel. Each corresponding second interference value, $CC_j$ and $AC_j$, represents interference received from the proposed transmission unit, $TU_p$ at the same co-channel and adjacent channel transmission units 202, $TU_j$, selected for determining the first interference values, and which have assigned channels potentially affected by interference, when the $TU_p$ uses the proposed channel. Each of the corresponding second interference values $CC_j$ is a coefficient $C_{p,j}$ which represents interference from the proposed transmission unit to a co-channel transmission unit, when the $TU_p$ uses the proposed channel. Each of the corresponding second interference values $AC_j$ is a coefficient $A_{p,j}$ which represents interference from the proposed transmission unit to each adjacent channel transmission unit, when the $TU_p$ uses the proposed channel.

The corresponding second interference values for channel three in the example being described herein, when the [CAM] has the channel assignments shown in Table 9 above, are shown in Table 13 below (Tables 1 and 2 are used for [C] and [A]).

TABLE 13

|     | CC Ch3 | AC Ch2 | AC Ch4 |
| --- | --- | --- | --- |
| TU1 |  | 0.00 |  |
| TU2 |  |  |  |
| TU3 |  |  | 0.00 |
| TU4 |  |  |  |
| TU5 |  |  |  |
| TU6 |  |  |  |
| TU7 |  | 0.50 |  |

In the example shown in Table 13, for proposed channel two, there are no transmission units 202 having channel two assigned, so there are no $CC_j$. TU1 and TU7 are assigned to channel one and TU3 is assigned to channel three, so there are three $AC_j$. The three $AC_j$ values are determined from $A_{1,j}$ values in Table 9, specifically $A_{1,1}$; $A_{1,7}$; and $A_{1,3}$.

The proposed channel element 579 (FIG. 5), which is coupled to the existing interference element 576, identifies the proposed channel as an uninterfered channel at step 1040 when two tests, T1 and T2, are both satisfied. T1, at step 1025, is satisfied when the proposed interference value $\Sigma C_p + \Sigma A_p$ is less than to a predetermined limit, e. T2, at step 1030, is satisfied when, for each co-channel transmission unit, $TUc_j$, the sum of $CEI_j$ and $CC_j$ is less than e and when, for each adjacent channel transmission unit, $TUa_j$, the sum of $AEI_j$ and $AC_j$ is less than e. The predetermined limit e is 1.0 in accordance with the preferred embodiment of the present invention. It will be appreciated that when both T1 and T2 are satisfied, the proposed channel can be used for the proposed transmitter with substantial certainty of not adding enough co-channel or adjacent channel interference to existing interference to prevent messages from being received at any channels already assigned for use at a transmission unit 202 and with substantial certainty of being received at the proposed transmission unit 202 when the proposed channel is assigned. When either T1 or T2 fail at steps 1025 and 1030, respectively, the existing interference element 576 identifies the proposed channel as an interfered channel at step 1035. At step 1045, a next proposed channel is used to determine the proposed, first, and corresponding second interference values, which are then tested to determined whether the proposed channel is uninterfering or interfering. When all proposed channels have been tested, the uninterfering channels form the set of uninterfering channels (which has zero or more channels).

At step 660 (FIG. 6), when the number of uninterfering channels is not zero, the uninterfering channel element 575 (FIG. 5) selects the uninterfering channel which has a lowest penalty function at step 665, as described herein below.

Figure 6:
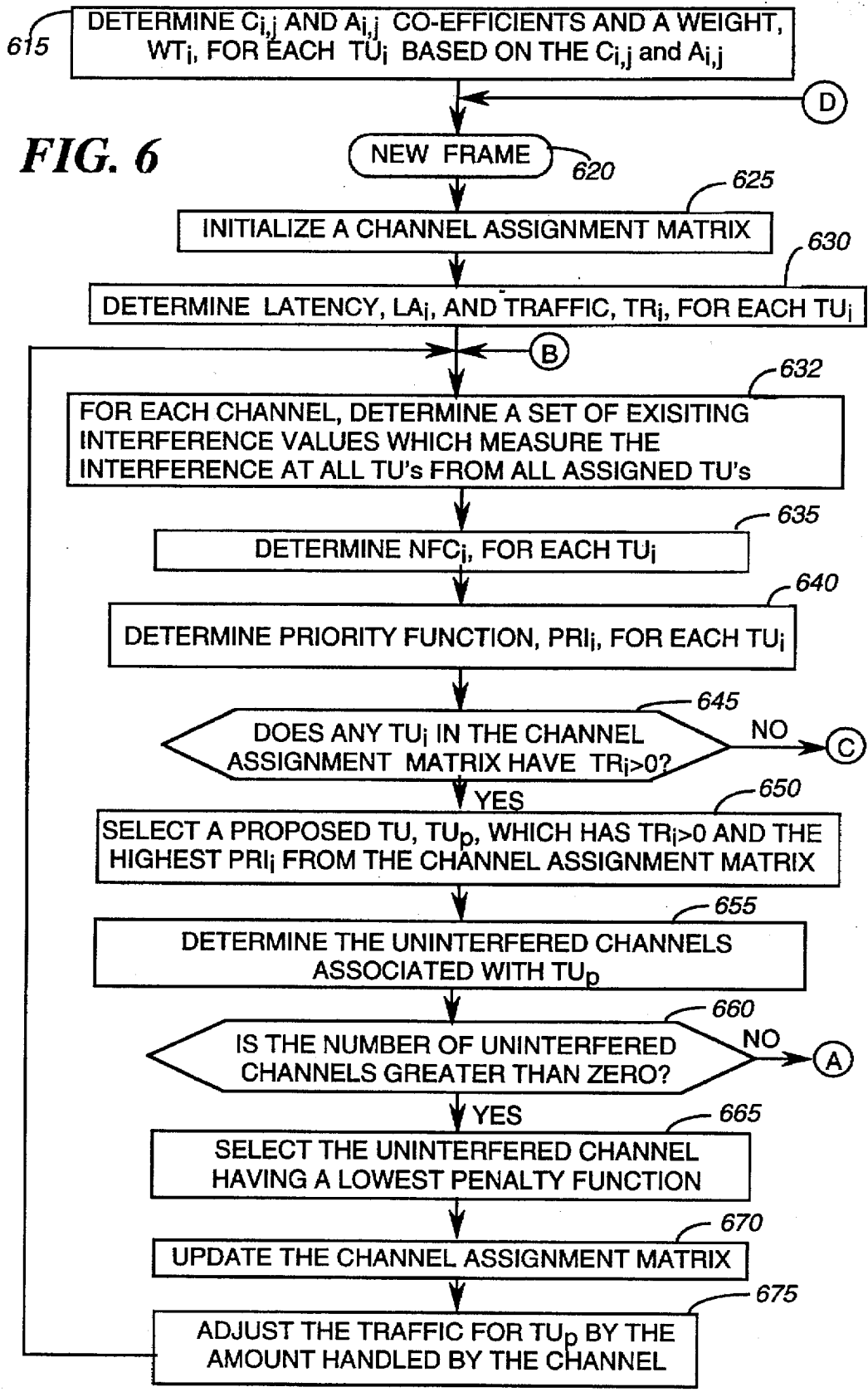
Figure 10:
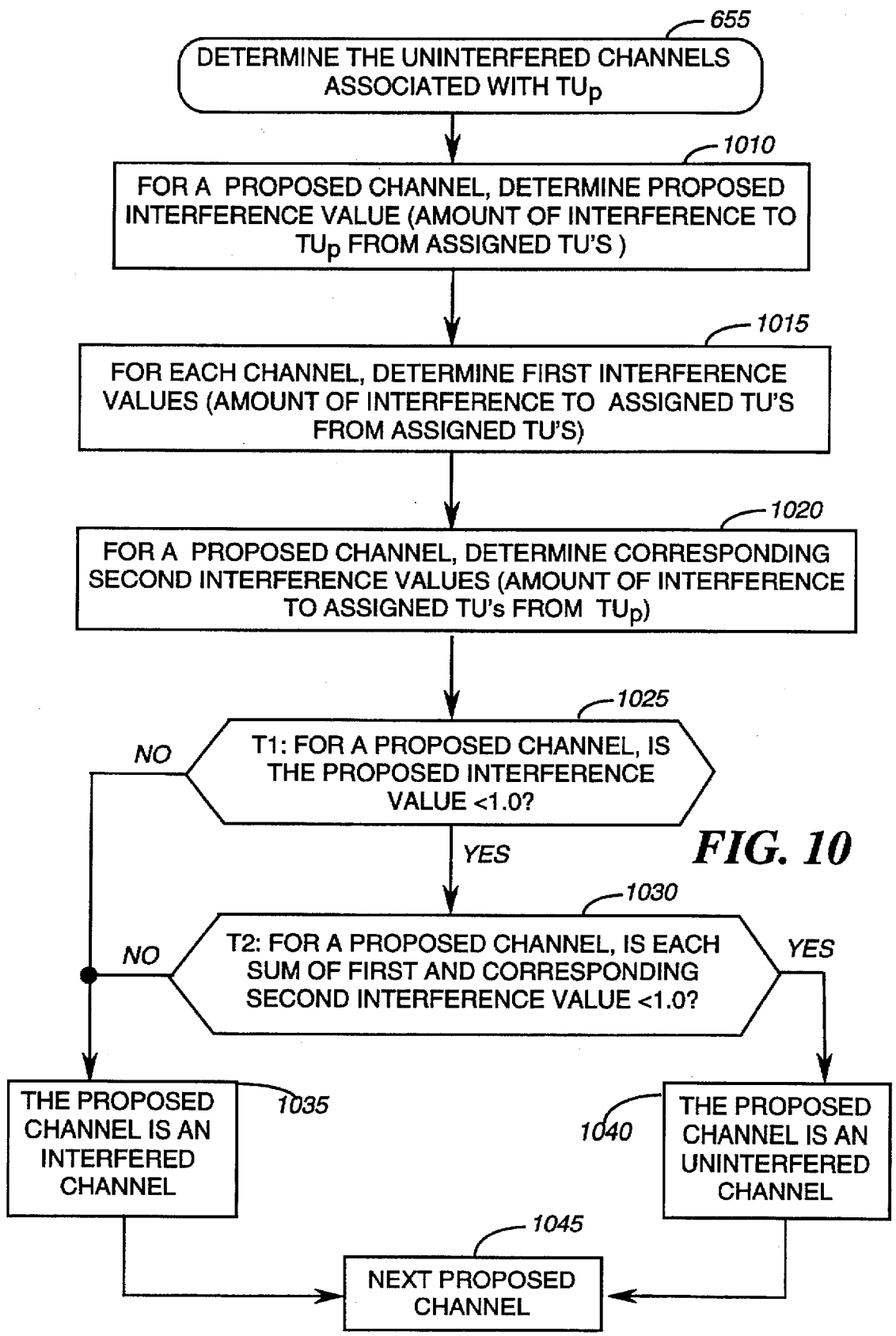

When, at step 660 (FIG. 6), the number of uninterfering channels is zero, the traffic, $TR_p$, for the proposed transmission unit, $TU_p$, is adjusted to zero by the uninterfering channel element 575 (FIG. 5), at step 661 (FIG. 8), and the message traffic for which the $TR_p$ was removed (adjusted to zero) is marked for storage by the scheduler 510 as excess traffic, and is scheduled for transmission in a later transmission cycle (frame), at step 662 (FIG. 8). Furthermore, the proposed transmission unit number, $TU_p$, is stored by the scheduler 510 in a list of transmission units 202 having potentially insufficient long term capacity. The method then continues at step 635 (FIG. 6). It will be appreciated that the technique described above substantially increases the re-use of co-channels and adjacent channels in a manner that minimizes the amount of excess traffic, when compared to prior art techniques.

In summary, identification as an uninterfered channel is made by the proposed channel element 579 when the proposed interference value is below the predetermined limit (T1) and when a sum of each first interference value and each corresponding second interference value is below the predetermined limit (T2).

In the example being described herein, after the three channel assignments have been made as shown in Table 9, above, for which $TU_p$ is TU7, the first interference value, $\Sigma C_p + \Sigma A_p$, is equal to 0 plus 0.5 plus 0 (from data columns one, two, and three of Table 11), so T1 passes. In other words, The assigned channels for TU1, TU7, and TU3 do not interfere with TU7 using proposed channel two. For T2, a first sum of the first and corresponding second interference values, which is for TU1, is equal to 0.06 plus 0.00, which is 0.06. A second sum of the first and corresponding second interference values, which is for TU7, is equal to 0.03 plus 0.50, which is 0.53. A third sum of the first and corresponding second interference values, which is for TU3, is equal to 0.00 plus 0.00, which is 0.00. None of the first, second, or third sums are greater than or equal to 1.0, so T2 passes in this example. Since both T1 and T2 passed, channel two is an uninterfered channel at this stage of this example.

It will be appreciated that, as an option, T1 can be used alone. This option does not provide results which are as optimum as using both T1 and T2 to determine the uninterfered channels, but using the option requires reduced computation and is appropriate when computing power available for the scheduler 510 is limited. Thus, using T1 alone compromises quality to achieve reduced complexity.

At step 665 (FIG. 6), the optimum channel selector element 571, which is coupled to the uninterfered channel element 575, comprises an existing interference element 572, a new interference element 573, a newly interfered transmission unit element 574, and a penalty function element 580. The optimum channel selector element 571 selects the optimum channel from the set of uninterfered channels. This is described in more detail with reference to steps 1110 to 1190 (FIG. 11).

At step 1110, all penalty functions in a set of penalty functions [PEN] are initialized to a maximum value by the optimum channel selector 571. An uninterfered channel, $UCH_m$, is selected at step 1120 from the set of uninterfered channels associated with the proposed transmission unit, $TU_p$. At step 1130, the existing interference element 572, which is coupled to the matrix memory 515, determines a set of existing interference values for unassigned transmission units 202, which are potentially affected by assignment of the selected channel to the proposed transmission unit 202, and which are any transmission units 202 to which the uninterfered channel is not assigned. The set of existing interference values are the existing interference values for unassigned transmission units which are co-channel or adjacent channel with respect to the selected channel. The existing interference value represents interference received at the unassigned transmission units from all other transmission units having assigned channels.

Also at step 1130, the new interference element 573, which is coupled to the matrix memory 515, determines a set of new interference values, [NI], for the unassigned transmission units 202 potentially affected by assignment of the selected channel to the, proposed transmission unit 202. The new interference values represents interference received at the unassigned transmission units from all other transmission units having assigned channels and the proposed transmission unit having the selected channel. Co-channel and adjacent channel interference values are added together for each transmission unit to determine each existing interference value. In accordance with the preferred embodiment of the present invention, the new interference values are calculated by temporarily adding one of the uninterfered channels to [CAM] and using the procedure described above to determine [EI]. Alternatively, they are determined by incrementally adding new interference values determined by the assignment of the proposed channel to the proposed transmission unit 202 to the existing interference values.

Also, at step 1130, the newly interfered transmission unit element 574, which is coupled to the existing interference element 572 and new interference element 573, determines a set of newly interfered transmission units $[NITU]_m$ by determining those transmission units 202 not assigned an uninterfered channel (that is, unassigned transmission units) which have a new interference value greater than or equal to a second predetermined value, f, and an existing interference value less than f. In accordance with the preferred embodiment of the present invention, f is 1.0. In summary, the newly interfered transmission units $[NITU]_m$ are those transmission units 202 for which the interference value has changed from a non-interfering value below f to an interfering value equal to or above f. It will be appreciated that the newly interfered transmission units 202 for an uninterfered channel are determined from the set of transmission unit assignments and the set of interference coefficients, and are those transmission units 202 not assigned an uninterfered channel for which the total determined interference has changed from below to above a value indicating a substantial likelihood of interference, due to the proposed use of the selected channel for the proposed transmission unit 202.

At steps 1140 to 1170, the penalty function element 580, which is coupled to the matrix memory 515, determines a penalty function, $PEN_m$, for the selected one of the uninterfered channels, $UCH_m$. $PEN_m$ is determined from channel parameters, which are: the damage measurements ($WT_i$) for the newly interfered transmission units, $[NITU]_m$, associated with $UCH_m$; the number of free channels, $NFC_i$ for the newly interfered transmission units, $[NITU]_m$, associated with $UCH_m$; and a number of co-channel transmission units, $CTU_m$, assigned to $UCH_m$. The number of co-channel transmission units, $CTU_m$, is simply the number of transmission units to which $UCH_m$ is assigned.

In accordance with the preferred embodiment of the present invention, each penalty function has a value which is determined by:

$$PEN_m = \sum_{i \in S} WT_i + g \sum_{i \in S} \frac{1}{NFC_i} + \frac{h}{1 + CTU_m} \qquad (9)$$

In equation 9, S is the set of newly interfered transmission units associated with the uninterfered channel, $UCH_m$. The constants g and h are predetermined constants.

At step 1140 the penalty function element 580 determines the first term of equation 9, by summing the $WT_i$ for each newly interfered transmission unit. This first term is a sum of the damage measurements for all the unassigned message traffic. The maximum possible value of the first term in the example being described herein is 2445, the sum of the N-1 largest values of $WT_i$.

At step 1150 the penalty function element 580 determines the second term of equation 9, by summing the reciprocal of $NFC_i$ for each newly interfered transmission unit and weighting the sum by the predetermined constant g. This second term is a measurement of the seriousness of the damages of the assigned channels to unassigned message traffic. The constant g is preferably predetermined such that the maximum value of the second term is substantially equal to the maximum possible value for the first term. It will be appreciated that each newly interfered transmission unit has at least one free channel.

At step 1160 the penalty function element 580 determines the third term of equation 9 by multiplying the predetermined constant h by the reciprocal of $(1+CTU_m)$, which is the number of assigned co-channel interfering transmission units for the channel $UCH_m$ (other than the proposed transmission unit 202). The third term has a higher penalty for channels having fewer assigned co-channel transmission units 202 The constant h is preferably predetermined such that the maximum value of the third term is substantially equal to the maximum possible value for the first term.

At step 1170 the penalty function element 580 adds the terms together.

The newly interfered transmission units, $[NITU]_m$, and the channel parameters $WT_i$ and $NFC_i$ for channel three for an example situation, are shown in Table 14 below (Tables 1 and 2 are used for [C] and [A]). A one in the column headed "NITU" indicates the TUi is a newly interfered $TU_i$.

TABLE 14

|     | $[NITU]_3$ | WT  | NFC |
|-----|-----------|-----|-----|
| TU1 | 1         | 814 | 3   |
| TU2 | 1         | 195 | 3   |
| TU3 | 1         | 583 | 3   |
| TU4 | 1         | 286 | 3   |
| TU5 | 1         | 228 | 3   |
| TU6 | 1         | 338 | 3   |
| TU7 | 0         | 135 | 3   |

When the penalty function element 580 determines, at step 1180 (FIG. 11), that a penalty function, $PEN_m$, has not been determined for all uninterfered channels, the process continues at step 1120. When the penalty function element 580 (FIG. 5) determines, at step 1180 (FIG. 11), that a penalty function, $PEN_m$, has been determined for all uninterfered channels, in other words, the set of penalty functions [PEN] has been determined for all uninterfered channels, the optimum channel selector element 571 (FIG. 5) selects the uninterfered channel having the smallest penalty function, $PEN_{min}$, and identifies the selected channel as the optimum channel, at step 1190.

It will be appreciated that the constants g, and h can be set to other values when some of the parameters are less or more important than as described in accordance with the preferred embodiment of the present invention, or that the function could be altered to eliminate one or two of the three parameters, $WT_i$, $NFC_i$, and $CTU_m$. Terms having products or other relationships of the parameters, $WT_i$, $NFC_i$, and $CTU_m$, may also be appropriate in some circumstances. For example, third term can alternatively be expressed as $h(CTU_m)$, wherein h is negative, or as $h(N-CTU_m)$, wherein h is positive. The $PEN_m$ function is therefore alternatively stated as simply being a function of the channel parameters, or:

$$PEN_m = f(WT_i, NFC_i, CTU_m) \quad (10)$$

It will be further appreciated that, inasmuch as the $WT_i$ and $NFC_i$ parameters are determined from the newly interfered transmission units 202, the channel parameters are all dependent on the determination of the set of $[NITU]_m$ for channel m.

At step 670 (FIG. 6) the channel assignment element 540, which is coupled to the optimum channel selector element 571 (FIG. 5), modifies the set of transmission unit channel assignments [CAM] using the proposed transmission unit, $TU_p$, and the optimum channel selected by the optimum channel selector element 571 at step 665, by adding the proposed channel as an assigned channel in the channel assignment matrix [CAM]. At step 675, the (FIG. 6) the channel assignment element 540, reduces the amount of traffic ($TR_i$) associated with the newly assigned transmission unit, $TU_p$, by the amount which can be handled by the newly assigned channel. This amount of traffic reduction can vary from channel to channel, depending on characteristics of the channels, such as baud rate and information protocol (e.g., error encoding, number of information words in the transmission cycle, etc.). When the amount of traffic which can be handled by the optimum channel is greater than the amount of traffic associated with the newly assigned transmission unit, that is, when the amount of traffic minus the amount which can be handled is less than zero, the channel has an excess capacity equivalent to the difference of the two amounts. The newly assigned transmission unit number, $TU_p$, is stored by the optimum channel selector element 571 in a list of transmission units 202 having excess capacity. The method then continues at step 635 (FIG. 6).

As stated above with reference to step 645 (FIG. 6), when no traffic remains for any transmission unit 202 (i.e., when all $TR_i$ are 0) at step 645, the process continues at step 910, shown in FIG. 9. At step 910, the information stored at step 662 in the list of transmission units having insufficient capacity (excess traffic) and the information stored at step 675 in the list of transmission units having excess capacity is analyzed off line, and used to make adjustments to improve the throughput of the radio communication system 100. For example, equipment can be added to increase the number of channels or the data rate of message traffic could be increased, or the tariff for message traffic in congested areas can be increased to reduce message traffic. These type of system adjustments occur at a much slower time scale than anticipated for the method and apparatus in accordance with the present invention.

It will be appreciated that when the technique in accordance with the preferred embodiment of the present invention is used for scheduling message traffic and channels for transmission units 202 in a multicell radio communication system 100, the throughput of the radio communication system 100 is substantially greater than in systems using prior art techniques, particularly when heterogeneous cells exist in the radio communication system 100, and that the system adjustments described above are needed less frequently because the system is adapted to changing message traffic loads.

In accordance with a second alternative embodiment of the present invention a compromise can be made to reduce complexity, by using only the co-channel coefficients in the above described technique, while still achieving much of the improvement described.

In accordance with a third alternative embodiment of the present invention, only one channel is assigned to all transmission units 202 in a radio communication system 100. In this instance, the technique is modified by eliminating the selection of an optimum channel using the penalty function; only the priority function is used. The modified technique serves to optimize frequency re-use in the single channel radio communication system 100. It will be appreciated that for a single channel system, the transmission unit channel assignment matrix [CAM], or set of transmission unit assignments, becomes simply a transmission unit assignment matrix of dimension N x 1.

It will be further appreciated that many protocols other than the FLEX™ family of protocols can be used with the technique described in accordance with the preferred embodiment of the present invention. For example, the technique could be used for the POCSAG (Post Office Code Standard Advisory Group) protocol, or substantially any protocol in which message traffic is batched and scheduled for transmission from a plurality of transmission units 202.

By now it should be appreciated that there has been provided a technique for scheduling message traffic in a radio communication system having multiple communication cells which optimizes the use of multiple radio transmission units having one or a plurality of outbound radio channels forming the multiple communication cells.

I claim:

1. A method used in a system controller for scheduling message traffic for transmission to a plurality of selective call radios in a radio communication system, wherein the radio communication system comprises a set of transmission units, said method comprising the steps of:

determining a set of interference coefficients, wherein an interference coefficient is a measure of transmission interference at a first transmission unit of a pair of transmission units from a second transmission unit of the pair of transmission units; and modifying a set of transmission unit assignments to establish an assignment of a proposed transmission unit, wherein the assignment is determined from the set of interference coefficients, wherein, in said step of determining, the interference coefficient is determined as a binary value, and wherein a first binary value represents a low likelihood of interference from the first transmission unit to the second transmission unit.

2. A method used in a system controller for scheduling message traffic for transmission to a plurality of selective call radios in a radio communication system, wherein the radio communication system comprises a set of transmission units, said method comprising the steps of:

determining a set of interference coefficients, wherein an interference coefficient is a measure of transmission interference at a first transmission unit of a pair of transmission units from a second transmission unit of the pair of transmission units; and modifying a set of transmission unit assignments to establish an assignment of a proposed transmission unit, wherein the assignment is determined from the set of interference coefficients, wherein, in said step of determining, the interference coefficient is determined to represent interference as a value relative to a signal to interference threshold, and wherein the interference coefficient is determined such that when a sum of a subset of the set of interference coefficients representing interference to a transmission unit is below a first predetermined value, a likelihood of interference to the transmission unit is low.

3. The method according to claim 2, wherein the interference coefficient is calculated as $$C_{i,j} = 10^{-[\frac{SC_{i,j} - SI_{th}}{10}]},$$

and wherein $C_{i,j}$ is the interference coefficient representing interference at the first transmission unit, $TU_j$, from the second transmission unit, $TU_i$, and wherein $SC_{i,j}$ is a signal to interference level determined in decibels for the first transmission unit and the second transmission unit, and wherein $SI_{th}$ is a predetermined signal to interference threshold.

4. A method used in a system controller for scheduling message traffic for transmission to a plurality of selective call radios in a radio communication system, wherein the radio communication system comprises a set of transmission units, said method comprising the steps of:

determining a set of interference coefficients, wherein an interference coefficient is a measure of transmission interference at a first transmission unit of a pair of transmission units from a second transmission unit of the pair of transmission units; and modifying a set of transmission unit assignments to establish an assignment of a proposed transmission unit, wherein the assignment is determined from the set of interference coefficients, wherein said step of determining a set of interference coefficients comprises the step of:

generating by a coefficient generating element, the interference coefficient from a signal to interference value determined at a critical point location associated with the first transmission unit of the pair of transmission units.

5. The method according to claim 4, wherein said step of generating the interference coefficient comprises the step of:

determining the critical point location for the first transmission unit as a point on or within a boundary of a cell associated with the first transmission unit for which the signal to interference value has a minimum value compared to signal to interference values determined at all points on or within the boundary of the cell associated with the first transmission unit.

6. A method used in a system controller for scheduling message traffic for transmission to a plurality of selective call radios in a radio communication system, wherein the radio communication system comprises a set of transmission units, said method comprising the steps of:

determining a set of interference coefficients, wherein an interference coefficient is a measure of transmission interference at a first transmission unit of a pair of transmission units from a second transmission unit of the pair of transmission units; and modifying a set of transmission unit assignments to establish an assignment of a proposed transmission unit, wherein the assignment is determined from the set of interference coefficients, wherein said step of determining a set of interference coefficients comprises the step of:

formulating a set of co-channel interference coefficients comprising one subset of co-channel interference coefficients for each transmission unit, wherein each co-channel interference coefficient in a first subset of co-channel interference coefficients represents a measure of co-channel interference at a first transmission unit which is generated from another of the transmission units, wherein the first transmission unit is common to all co-channel coefficients in the first subset.

7. A method used in a system controller for scheduling message traffic for transmission to a plurality of selective call radios in a radio communication system, wherein the radio communication system comprises a set of transmission units, said method comprising the steps of:

determining a set of interference coefficients, wherein an interference coefficient is a measure of transmission interference at a first transmission unit of a pair of transmission units from a second transmission unit of the pair of transmission units; and modifying a set of transmission unit assignments to establish an assignment of a proposed transmission unit, wherein the assignment is determined from the set of interference coefficients, wherein said step of determining a set of interference coefficients comprises the step of:

formulating a set of adjacent channel interference coefficients comprising one subset of adjacent channel interference coefficients for each transmission unit, wherein each adjacent channel interference coefficient in a first subset of adjacent channel interference coefficients represents a measure of adjacent channel interference at a first transmission unit which is generated from any transmission unit, wherein the first transmission unit is common for all adjacent channel coefficients in the first subset.

8. A method used in a system controller for scheduling message traffic for transmission to a plurality of selective call radios in a radio communication system, wherein the radio communication system comprises a set of transmission units, said method comprising the steps of:

determining a set of interference coefficients, wherein an interference coefficient is a measure of transmission interference at a first transmission unit of a pair of transmission units from a second transmission unit of the pair of transmission units;

modifying a set of transmission unit assignments to establish an assignment of a proposed transmission unit, wherein the assignment is determined from the set of interference coefficients; and selecting the proposed transmission unit from the set of transmission units using a priority function based on a transmission unit parameter which is determined from the set of interference coefficients, wherein the transmission unit parameter is a damage measurement which measures a difficulty of assigning the proposed transmission unit due to interference from other transmission units.

9. The method according to claim 8, wherein the transmission unit parameter is a sum of all interference coefficients in the set of interference coefficients which represent interference values from other transmission units to the proposed transmission unit.

10. The method according to claim 8, wherein in said step of selecting, the transmission unit parameter is a number of free channels determined from the set of transmission unit assignments and the set of interference coefficients, and wherein the number of free channels represents a number of outbound radio channels for the proposed transmission unit which have an existing interference less than a second predetermined value.

11. The method according to claim 8, wherein in said step of selecting, the priority function is further based on at least one of a group of transmission unit parameters consisting of a traffic parameter, a latency parameter, and a mobility parameter.

12. A method used in a system controller for scheduling message traffic for transmission to a plurality of selective call radios in a radio communication system, wherein the radio communication system comprises a set of transmission units, said method comprising the steps of:

determining a set of interference coefficients, wherein an interference coefficient is a measure of transmission interference at a first transmission unit of a pair of transmission units from a second transmission unit of the pair of transmission units;

modifying a set of transmission unit assignments to establish an assignment of a proposed transmission unit, wherein the assignment is determined from the set of interference coefficients; and selecting an optimum channel for the proposed transmission unit from a set of outbound radio channels using a penalty function based on the set of transmission unit assignments and the set of interference coefficients, wherein in said step of modifying, the set of transmission unit assignments are further modified to establish an assignment of the optimum channel to the proposed transmission unit; and wherein said step of selecting the optimum channel comprises the step of:

determining a set of uninterfered channels, each uninterfered channel being an outbound radio channel for which a calculation based on the set of transmission unit assignments, the proposed transmission unit, and the set of interference coefficients results in an interference level which represents interference from all assigned and the proposed transmission unit and which is below a third predetermined value at all assigned transmission units and the proposed transmission unit; and wherein in said step of selecting the optimum channel, the optimum channel is selected from the set of uninterfered channels, using the penalty function.

13. The method according to claim 12, wherein the set of transmission unit assignments comprises a set of unassigned channels and a set of assigned channels for the proposed transmission unit, and wherein said step of determining the set of uninterfered channels comprises the steps of:

determining a proposed interference value for a proposed channel which is a channel in the set of unassigned channels, wherein the proposed interference value represents interference received at the proposed transmission unit from other transmission units having an interfering assigned channel; and identifying the proposed channel as an uninterfered channel when the proposed interference value is below the third predetermined value.

14. The method according to claim 13, wherein said step of determining the set of uninterfered channels further comprises the steps of:

determining a set of first interference values for the proposed channel, wherein a first interference value represents an first interference received at an assigned transmission unit which has an assigned channel which is either the proposed channel or adjacent to the proposed channel, wherein the first interference is from assigned transmission units; and determining a set of corresponding second interference values for the proposed channel, wherein a corresponding second interference value represents a second interference received at the assigned transmission unit from the proposed transmission unit using the proposed channel, and wherein identification in said step of identifying the proposed channel as an uninterfered channel is further when the proposed interference value is below the third predetermined value and when a sum of each first interference value and the corresponding second interference value is below the third predetermined value.

15. The method according to claim 12, wherein said step of selecting the optimum channel comprises the steps of:

determining a set of newly interfered transmission units associated with an nninterfered radio channel, which are transmission units not assigned to the uninterfered radio channel, and for which a total determined interference has changed from below to above a fourth predetermined value, and wherein the total determined interference is determined from the set of transmission unit assignments and the set of interference coefficients; and determining the penalty function for the uninterfered channel, wherein the penalty function is determined from a subset of the set of interference coefficients which represent interference values from other transmission units to each transmission unit in the set of newly interfered transmission units, and wherein in said step of selecting the optimum channel, the optimum channel is identified as one of the set of uninterfered channels having a smallest penalty function value associated therewith.

16. The method according to claim 15, wherein in said step of determining the penalty function, the penalty function is further determined from at least one of a group of channel parameters consisting of a number of free channels associated with the set of newly interfered transmission units and a number of co-channel transmission units assigned to the uninterfered channel.

17. A method used in a system controller for scheduling message traffic for transmission to a plurality of selective call radios in a radio communication system, wherein the radio communication system comprises a set of transmission units, said method comprising the steps of:

determining a set of interference coefficients wherein an interference coefficient is a measure of transmission interference at a first transmission unit of a pair of transmission units from a second transmission unit of the pair of transmission units;

selecting a proposed transmission unit from the set of transmission units using a priority function based on a subset of the set of interference coefficients which represent interference values from other transmission units to the proposed transmission and based on at least one of a group of transmission unit parameters consisting of a traffic parameter, a latency parameter, and a mobility parameter;

selecting an optimum channel for the proposed transmission unit from a set of outbound radio channels using a penalty function based on a set of transmission unit assignments and the set of interference coefficients; and modifying a set of transmission unit assignments to establish an assignment of the optimum channel to the proposed transmission unit.

18. A system controller for scheduling message traffic for transmission to a plurality of selective call radios in a radio communication system, wherein the radio communication system comprises the system controller, a set of transmission units and a set of outbound radio channels, wherein said system controller comprises:

a scheduler for determining a schedule of outbound traffic transmissions, comprising:

an interference coefficient element for determining a set of interference coefficients, wherein an interference coefficient is a measure of transmission interference at a first transmission unit of a pair of transmission units from a second transmission unit of the pair of transmission units, and a channel assignment element for modifying a set of transmission unit assignments to establish an assignment of a proposed transmission unit, wherein the assignment is determined from the set of interference coefficients and from at least one of a group of transmission unit parameters consisting of a traffic parameter, a latency parameter, and a mobility parameter; and a matrix memory, coupled to said interference coefficient element and said channel assignment element, for storing the set of transmission unit assignments and the set of interference coefficients.

19. A system controller for scheduling message traffic for transmission to a plurality of selective call radios in a radio communication system, wherein the radio communication system comprises the system controller, a set of transmission units and a set of outbound radio channels, wherein said system controller comprises:

a scheduler for determining a schedule of outbound traffic transmissions, comprising:

an interference coefficient element for determining a set of interference coefficients, wherein an interference coefficient is a measure of transmission interference at a first transmission unit of a pair of transmission units from a second transmission unit of the pair of transmission units, and a channel assignment element for modifying a set of transmission unit assignments to establish an assignment of a proposed transmission unit, wherein the assignment is determined from the set of interference coefficients; and a matrix memory, coupled to said interference coefficient element and said channel assignment element, for storing the set of transmission unit assignments and the set of interference coefficients, wherein said interference coefficient element generates the interference coefficient having a binary value, and wherein a first binary value represents a low likelihood of interference from the first transmission unit to the second transmission unit.

20. A system controller for scheduling message traffic for transmission to a plurality of selective call radios in a radio communication system, wherein the radio communication system comprises the system controller, a set of transmission units and a set of outbound radio channels, wherein said system controller comprises:

a scheduler for determining a schedule of outbound traffic transmissions, comprising:

an interference coefficient element for determining a set of interference coefficients, wherein an interference coefficient is a measure of transmission interference at a first transmission unit of a pair of transmission units from a second transmission unit of the pair of transmission units, and a channel assignment element, for modifying a set of transmission unit assignments to establish an assignment of a proposed transmission unit, wherein the assignment is determined from the set of interference coefficients; and a matrix memory, coupled to said interference coefficient element and said channel assignment element, for storing the set of transmission unit assignments and the set of interference coefficients, wherein said interference coefficient element generates the interference coefficient to represent interference as a value relative to a signal to interference threshold, and wherein the interference coefficient is determined such that when a sum of a subset of the set of interference coefficients representing interference to a transmission unit is below a first predetermined value, a likelihood of interference to the transmission unit is low.

21. A system controller for scheduling message traffic for transmission to a plurality of selective call radios in a radio communication system, wherein the radio communication system comprises the system controller, a set of transmission units and a set of outbound radio channels, wherein said system controller comprises:

a scheduler for determining a schedule of outbound traffic transmissions, comprising:

an interference coefficient element for determining a set of interference coefficients, wherein an interference coefficient is a measure of transmission interference at a first transmission unit of a pair of transmission units from a second transmission unit of the pair of transmission units, and a channel assignment element for modifying a set of transmission unit assignments to establish an assignment of a proposed transmission unit, wherein the assignment is determined from the set of interference coefficients; and a matrix memory,, coupled to said interference coefficient element and said channel assignment element, for storing the set of transmission unit assignments and the set of interference coefficients, wherein said interference coefficient element further comprises:

a coefficient generation element, coupled to said matrix memory, for generating the interference coefficient from a signal to interference value determined at a critical point location associated with the first transmission unit of the pair of transmission units.

22. A system controller for scheduling message traffic for transmission to a plurality of selective call radios in a radio communication system, wherein the radio communication system comprises the system controller, a set of transmission units and a set of outbound radio channels, wherein said system controller comprises:

a scheduler for determining a schedule of outbound traffic transmissions, comprising:

an interference coefficient element for determining a set of interference coefficients, wherein an interference coefficient is a measure of transmission interference at a first transmission unit of a pair of transmission units from a second transmission unit of the pair of transmission units, and a channel assignment element for modifying a set of transmission unit assignments to establish an assignment of a proposed transmission unit, wherein the assignment is determined from the set of interference coefficients; and a matrix memory, coupled to said interference coefficient element and said channel assignment element, for storing the set of transmission unit assignments and the set of interference coefficients, wherein said scheduler further comprises:

a transmission unit selector element, coupled to said matrix memory, for selecting the proposed transmission unit from the set of transmission units using a priority function based on a transmission unit parameter which is determined from the set of interference coefficients.

23. The system controller according to claim 22, wherein said transmission unit selector element calculates the priority function based on at least one of a group of transmission trait parameters consisting of a damage measurement, a number of free channels, a traffic parameter, a latency parameter, and a mobility parameter, and wherein the damage measurement and the number of free channels are determined from the set of interference coefficients.

24. A system controller for scheduling message traffic for transmission to a plurality of selective call radios in a radio communication system, wherein the radio communication system comprises the system controller, a set of transmission units and a set of outbound radio channels, wherein said system controller comprises:

a scheduler for determining a schedule of outbound traffic transmissions, comprising:

an interference coefficient element for determining a set of interference coefficients, wherein an interference coefficient is a measure of transmission interference at a first transmission unit of a pair of transmission units from a second transmission unit of the pair of transmission units, and a channel assignment element for modifying a set of transmission unit assignments to establish an assignment of a proposed transmission unit, wherein the assignment is determined from the set of interference coefficients; and a matrix memory, coupled to said interference coefficient element and said channel assignment element, for storing the set of transmission unit assignments and the set of interference coefficients, wherein said scheduler further comprises:

an optimum channel identifier element, coupled to said matrix memory, for selecting an optimum channel for the proposed transmission unit from a set of outbound radio channels using a penalty function based on the set of transmission unit assignments and the set of interference coefficients, and wherein said channel assignment element further modifies the set of transmission unit assignments to establish an assignment of the optimum channel to the proposed transmission unit.

25. The system controller according to claim 24, wherein said optimum channel identifier element comprises:

an uninterfered channel element, coupled to said matrix memory, for determining a set of uninterfered channels, each uninterfered channel being an outbound radio channel for which a calculation based on the set of transmission unit assignments, the proposed transmission unit, and the set of interference coefficients results in an interference level which represents interference from all assigned and the proposed transmission unit and which is below a third predetermined value at all assigned transmission units and the proposed transmission unit, and wherein said optimum channel identifier element selects the optimum channel from the set of uninterfered channels, using the penalty function.

26. The system controller according to claim 25, wherein said optimum channel identifier element comprises:

a newly interfered transmission unit element, coupled to said matrix memory, for determining a set of newly interfered transmission units, which are transmission units not assigned an uninterfered channel, and for which a total determined interference of a new interfered transmission unit has changed from below to above a fourth predetermined value, and wherein the total determined interference is determined from the set of transmission unit assignments and the set of interference coefficients; and a penalty function element, coupled to said matrix memory, for determining the penalty function for the uninterfered channel, wherein the penalty function is determined from a subset of the set of interference coefficients which represent interference values from other transmission units to each transmission unit in the set of newly interfered transmission units, and wherein said step optimum channel identifier element identifies the optimum channel as one of the set of uninterfered channels having a smallest penalty function associated therewith.

27. The system controller according to claim 26, wherein said penalty function element further determines the penalty function from at least one of a group of channel parameters consisting of a number of free channels associated with the set of newly interfered transmission units and a number of co-channel transmission units assigned to the uninterfered channel.

* * * * *

UNITED STATES PATENT AND TRADEMARK OFFICE
CERTIFICATE OF CORRECTION

PATENT NO : 5,666,651
DATED : September 9, 1997
INVENTOR(S) : Wang

It is certified that error appears in the above-identified patent and that said Letters Patent are hereby corrected as shown below:

```
Column 27, line 10, change "nninterfered"
to --uninterfered--.

Column 27, line 57, change "assigruments"
to --assignments--.

Column 29, line 32, change ",," to --,--.

Column 30, line 7, change "trait"
to --unit--.
```

Signed and Sealed this

Fourteenth Day of December, 1999

Attest:

Q. TODD DICKINSON

*Attesting Officer*      *Acting Commissioner of Patents and Trademarks*